United States Patent
Zhang et al.

(10) Patent No.: US 12,237,981 B2
(45) Date of Patent: Feb. 25, 2025

(54) TRAFFIC ANOMALY DETECTION METHOD, AND MODEL TRAINING METHOD AND APPARATUS

(71) Applicant: Huawei Technologies Co., Ltd., Shenzhen (CN)

(72) Inventors: Yanfang Zhang, Nanjing (CN); Gang Li, Chengdu (CN); Li Xue, Nanjing (CN); Wei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 428 days.

(21) Appl. No.: 17/669,638

(22) Filed: Feb. 11, 2022

(65) Prior Publication Data

US 2022/0166681 A1    May 26, 2022

Related U.S. Application Data

(63) Continuation of application No. PCT/CN2020/107627, filed on Aug. 7, 2020.

(30) Foreign Application Priority Data

Aug. 15, 2019   (CN) .......................... 201910752193.9

(51) Int. Cl.
*H04L 41/14*  (2022.01)
*H04L 43/08*  (2022.01)

(52) U.S. Cl.
CPC ............ *H04L 41/145* (2013.01); *H04L 43/08* (2013.01)

(58) Field of Classification Search
CPC ... H04L 41/064; H04L 41/145; H04L 43/026; H04L 43/067; H04L 43/08; H04L 43/087; H04L 63/1425

See application file for complete search history.

(56) References Cited

U.S. PATENT DOCUMENTS 6,137,283 A * 10/2000 Williams ............... G01R 23/16
                                                                324/121 R
6,263,290 B1 * 7/2001 Williams ............... G01R 23/16
                                                                324/76.12

(Continued)

FOREIGN PATENT DOCUMENTS

CN     102111312 A       6/2011
CN     102288840 A  * 12/2011  ....... G01R 31/31709

(Continued)

OTHER PUBLICATIONS

Anton, S.D., et al., "Time is of the Essence:Machine Learning-based Intrusion Detection in Industrial Time Series Data", 2018 IEEE International Conference on Data Mining Workshops (ICDMW), 6 pages.

(Continued)

*Primary Examiner* — Eric Nowlin
(74) *Attorney, Agent, or Firm* — Conley Rose, P.C.

(57) ABSTRACT

A traffic anomaly detection method includes obtaining a target time series including N elements; obtaining a target parameter of the target time series, where the target parameter includes at least one of a periodic factor or a jitter density, the periodic factor represents a wave-shaped change that is presented in the target time series and that is about a long-term trend, and the jitter density represents a deviation between an actual value and a target value of the target time series within a target time; determining, from a plurality of types based on the target parameter, a first type to which the target time series belongs, where each of the types corresponds to one parameter set, and the target parameter belongs to a parameter set corresponding to the first type; and detecting an anomaly of the target time series based on a first-type decision model corresponding to the first type.

20 Claims, 13 Drawing Sheets

(56) References Cited

U.S. PATENT DOCUMENTS

| | | | | |
|---|---|---|---|---|
| 6,493,169 | B1* | 12/2002 | Ferris | G11B 15/4731 |
| | | | | 360/73.03 |
| 6,529,842 | B1* | 3/2003 | Williams | G01R 23/16 |
| | | | | 702/66 |
| 6,832,172 | B2* | 12/2004 | Ward | G01R 31/3171 |
| | | | | 702/69 |
| 6,898,535 | B2* | 5/2005 | Draving | H04L 1/205 |
| | | | | 702/77 |
| 7,010,444 | B2* | 3/2006 | Nishikobara | G01R 29/26 |
| | | | | 714/740 |
| 7,254,168 | B2* | 8/2007 | Guenther | H04L 1/205 |
| | | | | 702/69 |
| 7,388,937 | B1* | 6/2008 | Rodger | H04L 1/205 |
| | | | | 375/348 |
| 7,400,988 | B2* | 7/2008 | Tabatabaei | G01R 31/31709 |
| | | | | 375/228 |
| 7,512,196 | B2* | 3/2009 | Tabatabaei | G01R 31/31709 |
| | | | | 375/346 |
| 7,623,977 | B2* | 11/2009 | Tabatabaei | H04L 1/205 |
| | | | | 375/228 |
| 7,899,638 | B2* | 3/2011 | Miller | G01R 31/3171 |
| | | | | 702/69 |
| 7,941,287 | B2* | 5/2011 | Tabatabaei | H04L 1/205 |
| | | | | 375/228 |
| 8,065,141 | B2* | 11/2011 | Maeda | G10L 19/005 |
| | | | | 704/265 |
| 8,594,169 | B2* | 11/2013 | Zivny | G01R 31/31709 |
| | | | | 375/228 |
| 9,363,045 | B2* | 6/2016 | Agoston | H04L 1/205 |
| 9,506,951 | B2* | 11/2016 | Taratorin | G01R 13/029 |
| 9,787,416 | B2* | 10/2017 | Shiva | H04J 3/0632 |
| 9,954,546 | B2* | 4/2018 | Laquai | H03M 1/1071 |
| 10,530,422 | B2* | 1/2020 | Chen | H04B 3/46 |
| 10,942,219 | B2* | 3/2021 | Wong | H02M 3/156 |
| 10,958,551 | B2* | 3/2021 | Nitsch | H04L 43/045 |
| 11,243,249 | B2* | 2/2022 | Wong | H02M 1/143 |
| 11,620,528 | B2* | 4/2023 | Ryan | G06N 3/045 |
| | | | | 709/224 |
| 11,624,781 | B2* | 4/2023 | Guenther | G01R 31/31713 |
| | | | | 714/734 |
| 11,777,966 | B2* | 10/2023 | Jiang | H04L 63/1416 |
| | | | | 726/23 |
| 2003/0004664 | A1* | 1/2003 | Ward | G01R 31/3171 |
| | | | | 702/69 |
| 2004/0136450 | A1* | 7/2004 | Guenther | H04L 1/205 |
| | | | | 375/348 |
| 2004/0143406 | A1* | 7/2004 | Nishikobara | G01R 29/26 |
| | | | | 702/69 |
| 2005/0080574 | A1* | 4/2005 | Draving | H04L 1/205 |
| | | | | 702/69 |
| 2005/0232345 | A1* | 10/2005 | Ward | H04L 1/205 |
| | | | | 375/224 |
| 2005/0286627 | A1* | 12/2005 | Tabatabaei | G01R 29/26 |
| | | | | 370/210 |
| 2008/0319691 | A1* | 12/2008 | Tabatabaei | G01R 31/31709 |
| | | | | 375/228 |
| 2009/0106839 | A1 | 4/2009 | Cha et al. | |
| 2011/0292987 | A1* | 12/2011 | Zivny | G01R 31/31709 |
| | | | | 375/226 |
| 2013/0142242 | A1* | 6/2013 | Agoston | H04L 1/205 |
| | | | | 375/226 |
| 2016/0217022 | A1 | 7/2016 | Velipasaoglu et al. | |
| 2016/0231357 | A1* | 8/2016 | Taratorin | G01R 13/0254 |
| 2016/0292196 | A1* | 10/2016 | Yan | G06Q 30/0246 |
| 2017/0011299 | A1 | 1/2017 | Ebert et al. | |
| 2017/0244504 | A1* | 8/2017 | Chen | H04B 3/46 |
| 2017/0257107 | A1* | 9/2017 | Laquai | H03M 1/0836 |
| 2018/0053111 | A1* | 2/2018 | Yan | G06N 7/08 |
| 2019/0006937 | A1* | 1/2019 | Wong | G01R 31/31709 |
| 2019/0064264 | A1* | 2/2019 | Wong | G01R 31/31709 |
| 2019/0102276 | A1 | 4/2019 | Dang et al. | |
| 2019/0138643 | A1 | 5/2019 | Saini et al. | |
| 2019/0228296 | A1 | 7/2019 | Gefen et al. | |
| 2020/0387797 | A1* | 12/2020 | Ryan | G06N 3/084 |
| 2021/0042382 | A1* | 2/2021 | Freeman | G06F 17/40 |
| 2021/0160263 | A1* | 5/2021 | Jiang | H04L 63/20 |
| 2021/0374864 | A1* | 12/2021 | Kchouk | G06Q 40/06 |
| 2022/0166681 | A1 | 5/2022 | Zhang et al. | |
| 2022/0382857 | A1* | 12/2022 | Liu | G06F 21/552 |

FOREIGN PATENT DOCUMENTS

| | | | | |
|---|---|---|---|---|
| CN | 102288840 B | * | 10/2015 | G01R 31/31709 |
| CN | 106095655 A | | 11/2016 | |
| CN | 106685750 A | | 5/2017 | |
| CN | 107528722 A | | 12/2017 | |
| CN | 108804731 A | | 11/2018 | |
| CN | 109783876 A | | 5/2019 | |
| CN | 109784042 A | | 5/2019 | |
| CN | 109862129 A | | 6/2019 | |
| CN | 109871401 A | | 6/2019 | |
| CN | 109902703 A | | 6/2019 | |
| CN | 110266552 A | | 9/2019 | |
| CN | 109565239 B | * | 8/2021 | G01R 31/31709 |
| CN | 117397204 A | * | 1/2024 | G06F 16/2438 |
| EP | 1431770 A1 | * | 6/2004 | G01R 23/20 |
| EP | 2390789 A1 | * | 11/2011 | G01R 31/31709 |
| EP | 1431770 B1 | * | 2/2012 | G01R 23/20 |
| EP | 3451232 A1 | | 3/2019 | |
| EP | 3916667 A1 | * | 12/2021 | G06F 16/2379 |
| JP | 2004200868 A | * | 7/2004 | G01R 23/20 |
| JP | 3790741 B2 | * | 6/2006 | G01R 23/20 |
| JP | 2011247887 A | * | 12/2011 | G01R 31/31709 |
| JP | 2022176136 A | * | 11/2022 | G06F 18/2155 |
| TW | 201633721 A | * | 9/2016 | |
| WO | WO-2016082899 A1 | * | 6/2016 | H03M 1/0836 |
| WO | WO-2019019255 A1 | * | 1/2019 | |
| WO | WO-2021026243 A1 | * | 2/2021 | G06F 17/18 |
| WO | WO-2021189845 A1 | * | 9/2021 | G06F 16/2474 |
| WO | WO-2022251837 A1 | * | 12/2022 | G06F 16/2438 |
| WO | WO-2023175232 A1 | * | 9/2023 | G05B 23/024 |
| WO | WO-2023221701 A1 | * | 11/2023 | |
| WO | WO-2024057063 A1 | * | 3/2024 | |

OTHER PUBLICATIONS

Chandola, V., et al., "Anomaly Detection: A Survey," ACM Computing Surveys, Jul. 2009, 75 pages.

Li Yan, et al., "Network traffic anomaly detection based on time series analysis," Jan. 4, 2017, 4 pages.

Shangzhen Lin, et al., "Research On Real-Time Network Traffic Anomaly Detection Algorithm and System Realization," Nov. 25, 2017, 68 pages.

Liao Jun et al.,"Time series piecewise linear representation based on trend transition point," Computer Engineering and Applications, Computer Engineering and Applications, vol. 46, Issue 30, 2010, 5 pages.

* cited by examiner

200 — 210: Obtain a target time series, where the target time series includes N elements, the N elements correspond to N moments, and each of the N elements is traffic data received at a corresponding moment 220: Obtain a target parameter of the target time series based on the target time series, where the target parameter includes a periodic factor and/or a jitter density 230: Classify the target time series based on the target parameter

FIG. 2

400  410: Obtain a target time series, where the target time series includes N elements, the N elements correspond to N moments, and each of the N elements is traffic data received at a corresponding moment 420: Obtain a target parameter of the target time series based on the target time series, where the target parameter includes a periodic factor and/or a jitter density 430: Determine, from a plurality of types based on the target parameter, a first type to which the target time series belongs, where each of the plurality of types corresponds to one parameter set, and the target parameter belongs to a parameter set corresponding to the first type 440: Detect an anomaly of the target time series based on a first-type decision model corresponding to the first type, where each of the plurality of types corresponds to one type of decision model, and the decision model is used for traffic anomaly detection

FIG. 4

800 — 810: Obtain a target time series, where the target time series includes N elements, the N elements correspond to N moments, and each of the N elements is traffic data received at a corresponding moment 820: Decompose each of the N elements in the target time series into a trend component, a periodic component, and a residual component; and determine a third sub-time series including N trend components 830: Divide a second time series into M sub-series of a target length, where M is a positive integer, the second time series is the third sub-time series, or the second time series is formed based on the third sub-time series and a linear segmentation algorithm PLR 840: Calculate matrix profile MP values of the M sub-series of the target length, where the matrix profile MP values of the M sub-series of the target length form an MP time series 850: Detect an anomaly of the MP time series based on a third-type decision model

910: Obtain a first time series, where the first time series includes N elements, the N elements correspond to N moments, and each of the N elements is traffic data received at a corresponding moment 920: Obtain a first type of the first time series based on an original classification model of the first time series 930: Obtain an original type of the first time series 940: Adjust parameters of an original model of the first time series based on the original type of the first time series and the first type of the first time series, to obtain a target classification model of the first time series

1010: Obtain a first time series, where the first time series includes N elements, the N elements correspond to N moments, and each of the N elements is traffic data received at a corresponding moment 1020: Obtain a first type of the first time series based on an original classification model of the first time series 1030: Perform traffic anomaly detection on the first time series of the first type based on a first-type decision model corresponding to the first type, to obtain first data, where the first data is an anomalous point in the first time series 1040: Obtain second data, where the second data is an original anomalous point in the first time series 1050: Adjust a parameter of the first-type decision model based on the first data and the second data, to obtain a first target decision model

1110: Obtain a first time series, where the first time series includes N elements, the N elements correspond to N moments, and each of the N elements is traffic data received at a corresponding moment 1120: Obtain a first parameter set of the first time series based on an original parameter model of the first time series 1130: Perform traffic anomaly detection on the first time series based on a first-type decision model corresponding to the first parameter set, to obtain fourth data, where the fourth data is an anomalous point in the first time series 1140: Obtain First data, where the first data is an original anomalous point in the first time series 1150: Adjust a parameter of the first-type decision model based on first data and the fourth data, to obtain a first target decision model

FIG. 11

TRAFFIC ANOMALY DETECTION METHOD, AND MODEL TRAINING METHOD AND APPARATUS

CROSS-REFERENCE TO RELATED APPLICATIONS

This application is a continuation application of International Patent Application No. PCT/CN2020/107627, filed on Aug. 7, 2020, which claims priority to Chinese Patent Application No. 201910752193.9, filed on Aug. 15, 2019. The disclosures of the aforementioned applications are hereby incorporated by reference in their entireties.

TECHNICAL FIELD

This application relates to the field of machine learning, and in particular, to a traffic anomaly detection method, and a model training method and apparatus.

BACKGROUND

In the field of machine learning, anomaly detection refers to the detection of models, data, or time that do not conform to forecasting. Usually, in anomaly detection, professionals perform learning of historical data, and then find anomalous points. Data sources include applications, processes, operating systems, devices, or networks. As complexity of a computing system increases, manual work can no longer overcome the current difficulty of anomaly detection.

In the conventional technology, when anomaly detection is performed on network traffic data by using an algorithm based on statistics and data distribution, the precondition is an assumption that in a short time, traffic data follows a normal distribution. However, the network traffic data distribution does not follow a normal distribution in a short time. Therefore, the accuracy of anomaly detection on network traffic data using the algorithm based on statistics and data distribution is not high.

SUMMARY

This application provides a traffic anomaly detection method, and a model training method and apparatus, so as to improve the accuracy of anomaly detection on network traffic data by a model.

According to a first aspect, a traffic anomaly detection method is provided, including obtaining a target time series, where the target time series includes N elements, the N elements correspond to N moments, and each of the N elements is traffic data received at a corresponding moment, obtaining a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, determining, from a plurality of types based on the target parameter, a first type to which the target time series belongs, where each of the plurality of types corresponds to one parameter set, and the target parameter belongs to a parameter set corresponding to the first type, and detecting an anomaly of the target time series based on a first-type decision model corresponding to the first type, where each of the plurality of types corresponds to one type of decision model, and the decision model is used for traffic anomaly detection.

First, the target parameter of the target time series is determined based on the obtained target time series, second, the first type to which the target time series belongs is determined based on the target parameter, and finally, traffic anomaly detection is performed on the target time series based on the first-type decision model corresponding to the first type. Therefore, the accuracy of traffic anomaly detection can be improved.

With reference to the first aspect, in a possible implementation, obtaining a target parameter of the target time series based on the target time series includes decomposing each of the N elements in the target time series into a trend component, a periodic component, and a residual component, determining a first sub-time series including N periodic components and a second sub-time series including N residual components, and obtaining the target parameter of the target time series based on the first time sub-series or the second time sub-series.

With reference to the first aspect, in a possible implementation, obtaining the target parameter of the target time series based on the first time sub-series or the second time sub-series includes determining, based on the first sub-time series, whether the target time series has the periodic factor.

With reference to the first aspect, in a possible implementation, determining, based on the first sub-time series, whether the target time series has the periodic factor includes, when the N periodic components in the first sub-time series exist, determining that the target time series has the periodic factor, and when the N periodic components in the first sub-time series do not exist, determining that the target time series does not have the periodic factor.

With reference to the first aspect, in a possible implementation, the method further includes determining, based on a first mapping relationship and the first type to which the target time series belongs, a second-type decision model corresponding to the first type, where the first mapping relationship includes correspondences between the plurality of types and a plurality of second-type decision models, and detecting an anomaly of the target time series based on the second sub-time series and the second-type decision model corresponding to the first type, where the second-type decision model is an N-sigma model.

With reference to the first aspect, in a possible implementation, obtaining the target parameter of the target time series based on the first time sub-series or the second time sub-series includes determining the jitter density of the target time series based on the second sub-time series.

With reference to the first aspect, in a possible implementation, determining the jitter density of the target time series based on the second sub-time series includes determining R of the target time series according to the following formula:

$$R = \frac{\Sigma_0^{N-1} r_n}{N},$$

where R is the jitter density, and $r_n$ can be determined according to the following formula:

$$r_n = \begin{cases} 1, & \sqrt{\frac{\sum_n^{nW-1} C_n^2}{\sum_n^{nW-1} x_n^2}} \geq \alpha \\ 0, & \sqrt{\frac{\sum_n^{nW-1} C_n^2}{\sum_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and α is a first preset value.

With reference to the first aspect, in a possible implementation, determining, from a plurality of types based on the target parameter, a first type to which the target time series belongs includes determining, from the plurality of parameter sets based on the target parameter, a first parameter set to which the target parameter belongs, and determining, from the plurality of types based on a third mapping relationship and the first parameter set, the first type to which the target time series belongs, where the third mapping relationship includes correspondences between the plurality of parameter sets and the plurality of types.

The type described above may include periodic, aperiodic, stationary, spiky, periodic and stationary, periodic and spiky, aperiodic and stationary, or aperiodic and spiky.

The periodic type and the aperiodic type may be determined based on the periodic factor. Further, when the periodic factor exists, the type is the periodic type, and when the periodic factor does not exist, the type is the aperiodic type.

The stationary type and the spiky type may be determined based on the jitter density. Further, when the jitter density is greater than a second preset value, the type is the spiky type, and when the jitter density is less than or equal to the second preset value, the type is the stationary type.

The first parameter set to which the target parameter belongs is determined from the plurality of parameter sets based on the target parameter, and then the first type to which the target time series belongs is determined from the plurality of types based on the third mapping relationship and the first parameter set. In this way, the type to which the target time series belongs can be obtained, thereby completing classification of the target time series.

With reference to the first aspect, in a possible implementation, detecting an anomaly of the target time series based on a first-type decision model corresponding to the first type includes determining a third sub-time series including N trend components, dividing a second time series into M sub-series of a target length, where M is a positive integer, the second time series is the third sub-time series, or the second time series is formed based on the third sub-time series and a linear segmentation algorithm, e.g. piecewise linear regression (PLR), calculating matrix profile (MP) values of the M sub-series of the target length, where the MP values of the M sub-series of the target length form an MP time series, and detecting an anomaly of the target time series based on the MP time series and an N-sigma algorithm.

First, the second time series is divided into the M sub-series of the target length, where the second time series is the third sub-time series, or the second time series is formed based on the third sub-time series and the linear segmentation algorithm, e.g. PLR, second, the MP values of the M sub-series of the target length are calculated, and finally, an anomaly of the target time series is detected based on the MP time series and the N-sigma algorithm, thereby improving the accuracy of traffic anomaly detection.

With reference to the first aspect, in a possible implementation, the method further includes determining, based on a second mapping relationship and the first type to which the target time series belongs, the first-type decision model corresponding to the first type, where the second mapping relationship includes correspondences between the plurality of types and a plurality of first-type decision models.

The first-type decision model corresponding to the first type is determined based on the second mapping relationship and the first type to which the target time series belongs, so that a corresponding decision model can be determined for the type to which the target time series belongs, thereby improving the accuracy of traffic anomaly detection.

According to a second aspect, a traffic anomaly detection method is provided, including obtaining a target time series, where the target time series includes N elements, the N elements correspond to N moments, and each of the N elements is traffic data received at a corresponding moment, obtaining a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, determining, from a plurality of parameter sets, a first parameter set to which the target parameter belongs, and detecting an anomaly of the target time series based on a first-type decision model corresponding to the first parameter set, where each of the plurality of parameter sets corresponds to one type of decision model, and the decision model is used for traffic anomaly detection.

First, the target parameter of the target time series is determined based on the obtained target time series, second, the first parameter set to which the target time series belongs is determined based on the target parameter, and finally, traffic anomaly detection is performed on the target time series based on the first-type decision model corresponding to the first parameter set. Therefore, the accuracy of traffic anomaly detection can be improved.

With reference to the second aspect, in a possible implementation, obtaining a target parameter of the target time series based on the target time series includes decomposing each of the N elements in the target time series into a trend component, a periodic component, and a residual component, determining a first sub-time series including N periodic components and a second sub-time series including N residual components, and obtaining the target parameter of the target time series based on the first time sub-series or the second time sub-series.

With reference to the second aspect, in a possible implementation, obtaining the target parameter of the target time series based on the first time sub-series or the second time sub-series includes determining, based on the first sub-time series, whether the target time series has the periodic factor.

With reference to the second aspect, in a possible implementation, determining, based on the first sub-time series, whether the target time series has the periodic factor includes, when the N periodic components in the first sub-time series exist, determining that the target time series has the periodic factor, and when the N periodic components in the first sub-time series do not exist, determining that the target time series does not have the periodic factor.

With reference to the second aspect, in a possible implementation, the method further includes detecting an anomaly of the target time series based on the second sub-time series and the second-type decision model corresponding to the first parameter set, where the second-type decision model is an N-sigma model.

With reference to the second aspect, in a possible implementation, the method further includes determining, based on a fourth mapping relationship and the first parameter set to which the target parameter belongs, a second-type decision model corresponding to the first parameter set, where the fourth mapping relationship includes correspondences between the plurality of parameter sets and a plurality of second-type decision models.

With reference to the second aspect, in a possible implementation, obtaining the target parameter of the target time series based on the first time sub-series or the second time sub-series includes determining the jitter density of the target time series based on the second sub-time series.

With reference to the second aspect, in a possible implementation, determining the jitter density of the target time series based on the second sub-time series includes determining the jitter density of the target time series according to the following formula:

$$R = \frac{\sum_0^{N-1} r_n}{N},$$

where R is the jitter density, and $r_n$ can be determined according to the following formula:

$$r_n = \begin{cases} 1, & \sqrt{\frac{\sum_n^{nW-1} C_n^2}{\sum_n^{nW-1} x_n^2}} \geq \alpha \\ 0, & \sqrt{\frac{\sum_n^{nW-1} C_n^2}{\sum_n^{nW-1} x_n^2}} < \alpha \end{cases},$$

where $C_n$ is an $n^{th}$ element in the second sub-time series, and $x_n$ is an $n^{th}$ element in the target time series, and
N is determined according to the following formula:

$$N = \left[\frac{T}{W}\right],$$

where T is a length of the target time series, W is a window length of an addition window, and $\alpha$ is a first preset value.

With reference to the second aspect, in a possible implementation, detecting an anomaly of the target time series based on a first-type decision model corresponding to the first parameter set includes determining a third sub-time series including N trend components, dividing a second time series into M sub-series of a target length, where M is a positive integer, the second time series is the third sub-time series, or the second time series is formed based on the third sub-time series and a linear segmentation algorithm, e.g. PLR, calculating MP values of the M sub-series of the target length, where the MP values of the M sub-series of the target length form an MP time series, and detecting an anomaly of the target time series based on the MP time series and an N-sigma algorithm.

First, the second time series is divided into the M sub-series of the target length, where the second time series is the third sub-time series, or the second time series is formed based on the third sub-time series and the linear segmentation algorithm, e.g. PLR, second, the MP values of the M sub-series of the target length are calculated, and finally, an anomaly of the target time series is detected based on the MP time series and the N-sigma algorithm, thereby improving the accuracy of traffic anomaly detection.

With reference to the second aspect, in a possible implementation, the method further includes determining, based on a fifth mapping relationship and the first parameter set to which the target parameter belongs, a first-type decision model corresponding to the first parameter set, where the fifth mapping relationship includes correspondences between the plurality of parameter sets and a plurality of first-type decision models.

The first-type decision model corresponding to the first parameter set is determined based on the fifth mapping relationship and the first parameter set to which the target parameter belongs, so that a decision model corresponding to the target time series can be obtained, thereby improving the accuracy of traffic anomaly detection.

According to a third aspect, a traffic anomaly detection method is provided, where the method includes obtaining a target time series, where the target time series includes N elements, the N elements correspond to N moments, and each of the N elements is traffic data received at a corresponding moment, decomposing each of the N elements in the target time series into a trend component, a periodic component, and a residual component, determining a third sub-time series including N trend components, dividing a second time series into M sub-series of a target length, where M is a positive integer, the second time series is the third sub-time series, or the second time series is formed based on the third sub-time series and a linear segmentation algorithm, e.g. PLR, calculating MP values of the M sub-series of the target length, where the MP values of the M sub-series of the target length constitute an MP time series, and detecting an anomaly of the MP time series based on a third-type decision model.

First, the target time series is obtained, and the second time series is divided into the M sub-series of the target length, where the second time series is the third sub-time series, or the second time series is formed based on the third sub-time series and the linear segmentation algorithm, e.g. PLR, and the third sub-time series is a time series formed by trend components decomposed from each of the N elements in the target time series. Then, the MP values of the M sub-series of the target length are calculated. Finally, an anomaly of the target time series is detected based on the third-type decision model.

With reference to the third aspect, in a possible implementation, the method further includes determining a second sub-time series including N residual components, and detecting an anomaly of the target time series based on the second sub-time series and the third-type decision model.

With reference to the third aspect, in a possible implementation, the target length is specified by a communications protocol.

With reference to the third aspect, in a possible implementation, the third-type decision model is an N-sigma model.

According to a fourth aspect, a traffic pattern classification method is provided, including obtaining a target time series, where the target time series includes N elements, the N elements correspond to N moments, and each of the N elements is traffic data received at a corresponding moment, obtaining a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, and classifying the target time series based on the target parameter.

The target time series is obtained, and the target time series is classified based on the target parameter of the target time series, thereby facilitating subsequent processing on the classified target time series, and improving the accuracy of processing on the target time series.

With reference to the fourth aspect, in a possible implementation, obtaining a target parameter of the target time series based on the target time series includes decomposing each of the N elements in the target time series into a trend component, a periodic component, and a residual component, determining a first sub-time series including N periodic components and a second sub-time series including N residual components, and obtaining the target parameter of the target time series based on the first time sub-series or the second time sub-series.

With reference to the fourth aspect, in a possible implementation, obtaining the target parameter of the target time series based on the first time sub-series or the second time sub-series includes determining, based on the first sub-time series, whether the target time series has the periodic factor.

With reference to the fourth aspect, in a possible implementation, determining, based on the first sub-time series, whether the target time series has the periodic factor includes, when the N periodic components in the first sub-time series exist, determining that the target time series has the periodic factor, and when the N periodic components in the first sub-time series do not exist, determining that the target time series does not have the periodic factor.

With reference to the fourth aspect, in a possible implementation, classifying the target time series based on the target parameter includes, when the periodic factor exists, determining the target time series as periodic, and when the periodic factor does not exist, determining the target time series as aperiodic.

With reference to the fourth aspect, in a possible implementation, obtaining the target parameter of the target time series based on the first time sub-series or the second time sub-series includes determining the jitter density of the target time series based on the second sub-time series.

With reference to the fourth aspect, in a possible implementation, determining the jitter density of the target time series based on the second sub-time series includes determining R of the target time series according to the following formula:

$$R = \frac{\sum_0^{N-1} r_n}{N},$$

where R is the jitter density, and $r_n$ can be determined according to the following formula:

$$r_n = \begin{cases} 1, & \sqrt{\frac{\sum_n^{nW-1} C_n^2}{\sum_n^{nW-1} x_n^2}} \geq \alpha \\ 0, & \sqrt{\frac{\sum_n^{nW-1} C_n^2}{\sum_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and a is a first preset value.

With reference to the fourth aspect, in a possible implementation, classifying the target time series based on the target parameter includes, when the jitter density is greater than a second preset value, determining the target time series as spiky, and when the jitter density is less than or equal to the second preset value, determining the target time series as stationary.

According to a fifth aspect, a training method for a traffic anomaly detection model is provided, including obtaining a first time series, where the first time series includes N elements, the N elements correspond to N moments, and each of the N elements is traffic data received at a corresponding moment, obtaining a first type of the first time series based on an original classification model of the first time series, performing traffic anomaly detection on the first time series of the first type based on a first-type decision model corresponding to the first type, to obtain first data, where the first data is an anomalous point in the first time series, obtaining second data, where the second data is an original anomalous point in the first time series, and adjusting a parameter of the first-type decision model based on the first data and the second data, to obtain a first target decision model.

Optionally, a plurality of first time series may be obtained, and the first target decision model is trained based on the plurality of first time series.

With reference to the fifth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a sixth aspect, a training method for a traffic anomaly detection model is provided, including obtaining a first time series, where the first time series includes N elements, the N elements correspond to N moments, and each of the N elements is traffic data received at a corresponding moment, obtaining a first parameter set of the first time series based on an original parameter model of the first time series, performing traffic anomaly detection on the first time series based on a first-type decision model corresponding to the first parameter set, to obtain fourth data, where the fourth data is an anomalous point in the first time series, obtaining second data, where the second data is an original anomalous point in the first time series, and adjusting a parameter of the first-type decision model based on the second data and the fourth data, to obtain a first target decision model.

Optionally, a plurality of first time series may be obtained, and the first target decision model is trained based on the plurality of first time series.

With reference to the sixth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a seventh aspect, a training method for a traffic anomaly detection model is provided, where the method includes obtaining a first time series, where the first time series includes N elements, the N elements correspond to N moments, and each of the N elements is traffic data received at a corresponding moment, processing the first time series to obtain a third sub-time series, where the third sub-time series is a time series formed by trend components decomposed from each of the N elements in the first time series, performing traffic anomaly detection on the first time series based on a fourth-type decision model, to obtain third data, where the third data is an anomalous point in the first time series, obtaining second data, where the second data is an original anomalous point in the first time series, and adjusting a parameter of the fourth-type decision model based on the second data and the third data, to obtain a second target decision model.

Optionally, a plurality of first time series may be obtained, and the second target decision model is trained based on the plurality of first time series.

According to an eighth aspect, a training method for a traffic pattern classification model is provided, including obtaining a first time series, where the first time series includes N elements, the N elements correspond to N moments, and each of the N elements is traffic data received at a corresponding moment, obtaining a first type of the first time series based on an original classification model of the first time series, obtaining an original type of the first time series, and adjusting parameters of an original model of the first time series based on the original type of the first time series and the first type of the first time series, to obtain a target classification model of the first time series.

With reference to the eighth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a ninth aspect, a traffic anomaly detection apparatus is provided, including a memory configured to store a program, and a processor configured to execute the program stored in the memory, where when the processor executes the program stored in the memory, the processor is configured to obtain a target time series, where the target time series includes N elements, the N elements correspond to N moments, and each of the N elements is traffic data received at a corresponding moment, obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, determine, from a plurality of types based on the target parameter, a first type to which the target time series belongs, where each of the plurality of types corresponds to one parameter set, and the target parameter belongs to a parameter set corresponding to the first type, and detect an anomaly of the target time series based on a first-type decision model corresponding to the first type, where each of the plurality of types corresponds to one type of decision model, and the decision model is used for traffic anomaly detection.

With reference to the ninth aspect, in a possible implementation, the processor is further configured to decompose each of the N elements in the target time series into a trend component, a periodic component, and a residual component, determine a first sub-time series including N periodic components and a second sub-time series including N residual components, and obtain the target parameter of the target time series based on the first time sub-series or the second time sub-series.

With reference to the ninth aspect, in a possible implementation, the processor is further configured to determine, based on the first sub-time series, whether the target time series has the periodic factor.

With reference to the ninth aspect, in a possible implementation, the processor is further configured to, when the N periodic components in the first sub-time series exist, determine that the target time series has the periodic factor, and when the N periodic components in the first sub-time series do not exist, determine that the target time series does not have the periodic factor.

With reference to the ninth aspect, in a possible implementation, the processor is further configured to determine, based on a first mapping relationship and the first type to which the target time series belongs, a second-type decision model corresponding to the first type, where the first mapping relationship includes correspondences between the plurality of types and a plurality of second-type decision models, and detect an anomaly of the target time series based on the second sub-time series and the second-type decision model corresponding to the first type, where the second-type decision model is an N-sigma model.

With reference to the ninth aspect, in a possible implementation, the processor is further configured to determine the jitter density of the target time series based on the second sub-time series.

With reference to the ninth aspect, in a possible implementation, the processor is further configured to determine R of the target time series according to the following formula:

$$R = \frac{\sum_{0}^{N-1} r_n}{N},$$

where R is the jitter density, and $r_n$ can be determined according to the following formula:

$$r_n = \begin{cases} 1, & \sqrt{\frac{\sum_{n}^{nW-1} C_n^2}{\sum_{n}^{nW-1} x_n^2}} \geq \alpha \\ 0, & \sqrt{\frac{\sum_{n}^{nW-1} C_n^2}{\sum_{n}^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and α is a first preset value.

With reference to the ninth aspect, in a possible implementation, the processor is further configured to determine, from the plurality of parameter sets based on the target parameter, a first parameter set to which the target parameter belongs, and determine, from the plurality of types based on a third mapping relationship and the first parameter set, the first type to which the target time series belongs, where the third mapping relationship includes correspondences between the plurality of parameter sets and the plurality of types.

The type described above may include periodic, aperiodic, stationary, spiky, periodic and stationary, periodic and spiky, aperiodic and stationary, or aperiodic and spiky.

The periodic type and the aperiodic type may be determined based on the periodic factor. Further, when the periodic factor exists, the type is the periodic type, and when the periodic factor does not exist, the type is the aperiodic type.

The stationary type and the spiky type may be determined based on the jitter density. Further, when the jitter density is greater than a second preset value, the type is the spiky type, and when the jitter density is less than or equal to the second preset value, the type is the stationary type.

With reference to the ninth aspect, in a possible implementation, the processor is further configured to determine a third sub-time series including N trend components, divide a second time series into M sub-series of a target length, where M is a positive integer, the second time series is the third sub-time series, or the second time series is formed based on the third sub-time series and a linear segmentation algorithm, e.g. PLR, calculate MP values of the M sub-series of the target length, where the MP values of the M sub-series of the target length constitute an MP time series, and detect an anomaly of the target time series based on the MP time series and an N-sigma algorithm.

With reference to the ninth aspect, in a possible implementation, the processor is further configured to determine, based on a second mapping relationship and the first type to which the target time series belongs, the first-type decision model corresponding to the first type, where the second mapping relationship includes correspondences between the plurality of types and a plurality of first-type decision models.

According to a tenth aspect, a traffic anomaly detection apparatus is provided, including a memory configured to store a program, and a processor configured to execute the program stored in the memory, where when the processor executes the program stored in the memory, the processor is configured to obtain a target time series, where the target time series includes N elements, the N elements correspond to N moments, and each of the N elements is traffic data received at a corresponding moment, obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, determine, from a plurality of parameter sets, a first parameter set to which the target parameter belongs, and detect an anomaly of the target time series based on a first-type decision model corresponding to the first parameter set, where each of the plurality of parameter sets corresponds to one type of decision model, and the decision model is used for traffic anomaly detection.

With reference to the tenth aspect, in a possible implementation, the processor is further configured to decompose each of the N elements in the target time series into a trend component, a periodic component, and a residual component, determine a first sub-time series including N periodic components and a second sub-time series including N residual components, and obtain the target parameter of the target time series based on the first time sub-series or the second time sub-series.

With reference to the tenth aspect, in a possible implementation, the processor is further configured to determine, based on the first sub-time series, whether the target time series has the periodic factor.

With reference to the tenth aspect, in a possible implementation, the processor is further configured to, when the N periodic components in the first sub-time series exist, determine that the target time series has the periodic factor, and when the N periodic components in the first sub-time series do not exist, determine that the target time series does not have the periodic factor.

With reference to the tenth aspect, in a possible implementation, the processor is further configured to detect an anomaly of the target time series based on the second sub-time series and the second-type decision model corresponding to the first parameter set, where the second-type decision model is an N-sigma model.

With reference to the tenth aspect, in a possible implementation, the processor is further configured to determine, based on a fourth mapping relationship and the first parameter set to which the target parameter belongs, a second-type decision model corresponding to the first parameter set, where the fourth mapping relationship includes correspondences between the plurality of parameter sets and a plurality of second-type decision models.

With reference to the tenth aspect, in a possible implementation, the processor is further configured to determine the jitter density of the target time series based on the second sub-time series.

With reference to the tenth aspect, in a possible implementation, the processor is further configured to determine the jitter density of the target time series according to the following formula:

$$R = \frac{\sum_{0}^{N-1} r_n}{N},$$

where R is the jitter density, and $r_n$ can be determined according to the following formula:

$$r_n = \begin{cases} 1, & \sqrt{\frac{\sum_{n}^{nW-1} C_n^2}{\sum_{n}^{nW-1} x_n^2}} \geq \alpha \\ 0, & \sqrt{\frac{\sum_{n}^{nW-1} C_n^2}{\sum_{n}^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and α is a first preset value.

With reference to the tenth aspect, in a possible implementation, the processor is further configured to determine a third sub-time series including N trend components, divide a second time series into M sub-series of a target length, where M is a positive integer, the second time series is the third sub-time series, or the second time series is formed based on the third sub-time series and a linear segmentation algorithm, e.g. PLR, calculate MP values of the M sub-series of the target length, where the MP values of the M sub-series of the target length constitute an MP time series, and detect an anomaly of the target time series based on the MP time series and an N-sigma algorithm.

With reference to the tenth aspect, in a possible implementation, the processor is further configured to determine, based on a fifth mapping relationship and the first parameter set to which the target parameter belongs, a first-type decision model corresponding to the first parameter set, where the fifth mapping relationship includes correspondences between the plurality of parameter sets and the plurality of first-type decision models.

According to an eleventh aspect, a traffic anomaly detection apparatus is provided, including a memory configured to store a program, and a processor configured to execute the program stored in the memory, where when the processor executes the program stored in the memory, the processor is configured to obtain a target time series, where the target time series includes N elements, the N elements correspond to N moments, and each of the N elements is traffic data received at a corresponding moment, decompose each of the N elements in the target time series into a trend component, a periodic component, and a residual component, determine a third sub-time series including N trend components, divide a second time series into M sub-series of a target length, where M is a positive integer, the second time series is the third sub-time series, or the second time series is formed based on the third sub-time series and a linear segmentation algorithm, e.g. PLR, calculate MP values of the M sub-series of the target length, where the MP values of the M sub-series of the target length constitute an MP time series, and detect an anomaly of the MP time series based on a third-type decision model.

With reference to the eleventh aspect, in a possible implementation, the processor is further configured to determine a second sub-time series including N residual components, and detect an anomaly of the target time series based on the second sub-time series and the third-type decision model.

With reference to the eleventh aspect, in a possible implementation, the target length is specified by a communications protocol.

With reference to the eleventh aspect, in a possible implementation, the third-type decision model is an N-sigma model.

According to a twelfth aspect, a traffic pattern classification apparatus is provided, including a memory configured to store a program, and a processor configured to execute the program stored in the memory, where when the processor executes the program stored in the memory, the processor is configured to obtain a target time series, where the target time series includes N elements, the N elements correspond to N moments, and each of the N elements is traffic data received at a corresponding moment, obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time, and classify the target time series based on the target parameter.

With reference to the twelfth aspect, in a possible implementation, the processor is further configured to decompose each of the N elements in the target time series into a trend component, a periodic component, and a residual component, determine a first sub-time series including N periodic components and a second sub-time series including N residual components, and obtain the target parameter of the target time series based on the first time sub-series or the second time sub-series.

With reference to the twelfth aspect, in a possible implementation, the processor is further configured to determine, based on the first sub-time series, whether the target time series has the periodic factor.

With reference to the twelfth aspect, in a possible implementation, the processor is further configured to, when the N periodic components in the first sub-time series exist, determine that the target time series has the periodic factor, and when the N periodic components in the first sub-time series do not exist, determine that the target time series does not have the periodic factor.

With reference to the twelfth aspect, in a possible implementation, the processor is further configured to, when the periodic factor exists, determine the target time series as periodic, and when the periodic factor does not exist, determine the target time series as aperiodic.

With reference to the twelfth aspect, in a possible implementation, the processor is further configured to determine the jitter density of the target time series based on the second sub-time series.

With reference to the twelfth aspect, in a possible implementation, the processor is further configured to determine R of the target time series according to the following formula:

$$R = \frac{\sum_0^{N-1} r_n}{N},$$

where R is the jitter density, and $r_n$ can be determined according to the following formula:

$$r_n = \begin{cases} 1, & \sqrt{\frac{\sum_n^{nW-1} C_n^2}{\sum_n^{nW-1} x_n^2}} \geq \alpha \\ 0, & \sqrt{\frac{\sum_n^{nW-1} C_n^2}{\sum_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and α is a first preset value.

With reference to the twelfth aspect, in a possible implementation, the processor is further configured to, when the jitter density is greater than a second preset value, determine the target time series as spiky, and when the jitter density is less than or equal to the second preset value, determine the target time series as stationary.

According to a thirteenth aspect, a training apparatus for a traffic anomaly detection model is provided, including a memory configured to store a program, and a processor configured to execute the program stored in the memory, where when the processor executes the program stored in the memory, the processor is configured to obtain a first time series, where the first time series includes N elements, the N elements correspond to N moments, and each of the N elements is traffic data received at a corresponding moment, obtain a first type of the first time series based on an original classification model of the first time series, perform traffic anomaly detection on the first time series of the first type based on a first-type decision model corresponding to the first type, to obtain first data, where the first data is an anomalous point in the first time series, obtain second data, where the second data is an original anomalous point in the first time series, and adjust a parameter of the first-type decision model based on the first data and the second data, to obtain a first target decision model.

Optionally, the processor may obtain a plurality of first time series, and train the first target decision model based on the plurality of first time series.

With reference to the thirteenth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a fourteenth aspect, a training apparatus for a traffic anomaly detection model is provided, including a memory configured to store a program, and a processor configured to execute the program stored in the memory, where when the processor executes the program stored in the memory, the processor is configured to obtain a first time series, where the first time series includes N elements, the N elements correspond to N moments, and each of the N elements is traffic data received at a corresponding moment, obtain a first parameter set of the first time series based on an original parameter model of the first time series, perform traffic anomaly detection on the first time series based on a first-type decision model corresponding to the first parameter set, to obtain fourth data, where the fourth data is an anomalous point in the first time series, obtain second data, where the second data is an original anomalous point in the first time series, and adjust a parameter of the first-type decision model based on the second data and the fourth data, to obtain a first target decision model.

Optionally, the processor may obtain a plurality of first time series, and train the first target decision model based on the plurality of first time series.

With reference to the fourteenth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a fifteenth aspect, a training apparatus for a traffic anomaly detection model is provided, including a memory configured to store a program, and a processor configured to execute the program stored in the memory, where when the processor executes the program stored in the memory, the processor is configured to obtain a first time series, where the first time series includes N elements, the N elements correspond to N moments, and each of the N elements is traffic data received at a corresponding moment, process the first time series to obtain a third sub-time series, where the third sub-time series is a time series formed by trend components decomposed from each of the N elements in the first time series, perform traffic anomaly detection on the first time series based on a fourth-type decision model, to obtain third data, where the third data is an anomalous point in the first time series, obtain second data, where the second data is an original anomalous point in the first time series, and adjust a parameter of the fourth-type decision model based on the second data and the third data, to obtain a second target decision model.

Optionally, the processor may obtain a plurality of first time series, and train the second target decision model based on the plurality of first time series.

According to a sixteenth aspect, a training apparatus for a traffic pattern classification model is provided, including a memory configured to store a program, and a processor configured to execute the program stored in the memory, where when the processor executes the program stored in the memory, the processor is configured to obtain a first time series, where the first time series includes N elements, the N elements correspond to N moments, and each of the N elements is traffic data received at a corresponding moment, obtain a first type of the first time series based on an original classification model of the first time series, obtain an original type of the first time series, and adjust parameters of an original model of the first time series based on the original type of the first time series and the first type of the first time series, to obtain a target classification model of the first time series.

With reference to the sixteenth aspect, in a possible implementation, the first type of the first time series is a periodic type or an aperiodic type, a spiky type, a stationary type, a periodic and stationary type, an aperiodic and stationary type, a periodic and spiky type, or an aperiodic and spiky type.

According to a seventeenth aspect, a computer storage medium is provided, where the computer storage medium stores program code, and the program code is used to perform the method according to any one of the possible implementations in the first to the eighth aspects described above.

According to an eighteenth aspect, a computer program product containing instructions is provided, where when the computer program product runs on a computer, the computer is enabled to perform the method according to any one of the possible implementations in the first to the eighth aspects described above.

According to a nineteenth aspect, a chip is provided, where the chip includes a processor and a data interface, and the processor reads instructions stored in a memory through the data interface, to perform the method according to any one of the possible implementations in the first to the eighth aspects described above.

Optionally, as an implementation, the chip may further include a memory having instructions stored therein, where the processor is configured to execute the instructions stored in the memory, and when the instructions are executed, the processor is configured to perform the method according to any one of the possible implementations in the first to the eighth aspects described above.

The chip may be a field-programmable gate array (FPGA) or an application-specific integrated circuit (ASIC).

BRIEF DESCRIPTION OF DRAWINGS

FIG. 2 is a schematic flowchart of a traffic pattern classification method according to an embodiment of this application;

FIG. 4 is a schematic flowchart of a traffic anomaly detection method according to an embodiment of this application;

FIG. 8 is a schematic flowchart of another traffic anomaly detection method according to an embodiment of this application;

FIG. 9 is a schematic flowchart of a training method for a traffic pattern classification model according to an embodiment of this application;

FIG. 10 is a schematic flowchart of a training method for a traffic anomaly detection model according to an embodiment of this application;

FIG. 11 is a schematic flowchart of another training method for a traffic anomaly detection model according to an embodiment of this application;

DETAILED DESCRIPTION OF EMBODIMENTS

For ease of understanding, the following first describes several concepts in the embodiments of this application.

1. A time series is a series of data points indexed in time order. Generally, a time interval of a time series is a constant value, and therefore the time series may be used as discrete-time data for analysis and processing. Anomaly detection for a time series is usually to find data points that are far away from a relatively established pattern or distribution. Anomalies in a time series include a sudden rise, a sudden fall, changes in mean, and the like. Time series anomaly detection algorithms include an algorithm based on statistics and data distribution (N-Sigma), a distance/density-based algorithm (local outlier factor algorithm), isolation forest, a forecasting-based algorithm (autoregressive integrated moving average (ARIMA)), and the like.

2. Traffic anomaly detection: Anomaly detection is performed on traffic data collected from devices or ports in a network. An anomaly detection result provides a basis for the discovery of network attacks, configuration errors, and network device faults.

3. N-Sigma algorithm:

It is assumed that data traffic follows a normal distribution in a short time, that is:

$$P(x_t; \mu, \sigma) = \frac{1}{\sqrt{2\pi\sigma^2}} e^{\left(-\frac{(x_t-\mu)^2}{2\sigma^2}\right)},$$

where $x_t$ is traffic data at a moment t, $\mu$ is the mean of the normal distribution, and $\sigma$ is the standard deviation of the normal distribution.

The mean and the standard deviation may be estimated by using n pieces of historical traffic data $(x_1, x_2, \ldots x_t, \ldots x_n)$ in a time window, and their estimates are as follows:

$$\mu = \frac{\sum_1^n x_n}{n}$$

$$\sigma = \sqrt{\frac{\sum_1^n (x_n - \mu)^2}{n}}.$$

If a distance between traffic data $x_t$ to be detected and the mean is greater than a preset value, the traffic data $x_t$ to be detected is an anomalous point, that is:

$$\frac{|x_t - \mu|}{\sigma} > Y,$$

where Y is the preset value.

If the distance between the traffic data $x_t$ to be detected and the mean is less than or equal to the preset value, the traffic data $x_t$ to be detected is a normal point, that is:

$$\frac{|x_t - \mu|}{\sigma} \leq Y$$

In the N-sigma algorithm, anomaly detection is performed on network traffic data based on the assumption that the traffic data follows a normal distribution in a short time. However, the network traffic data distribution does not follow a normal distribution in a short time. Therefore, the accuracy of anomaly detection on network traffic data using the algorithm based on statistics and data distribution is not high.

Therefore, there is an urgent need for a method that can improve the accuracy of traffic data anomaly detection.

A system architecture of an embodiment of this application is described in detail below with reference to FIG. 1.

Figure 1:
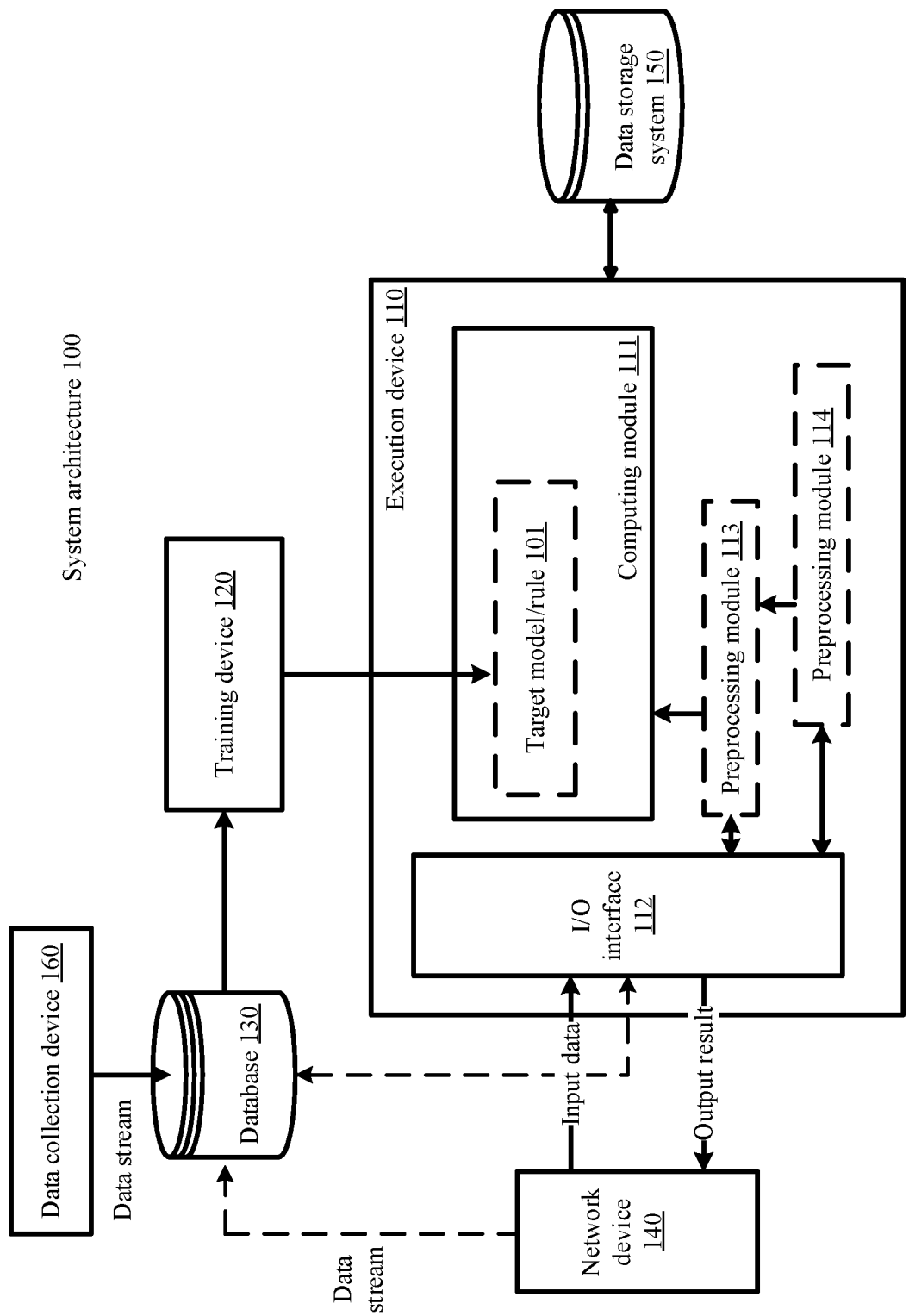
FIG. 1 is a schematic structural diagram of a system architecture according to an embodiment of this application.

FIG. 1 is a schematic diagram of a system architecture according to an embodiment of this application. As shown in FIG. 1, the system architecture 100 includes an execution device 110, a training device 120, a database 130, a network device 140, a data storage system 150, and a data collection device 160.

In addition, the execution device 110 includes a computing module 111, an input/output (I/O) interface 112, a preprocessing module 113, and a preprocessing module 114. The computing module 111 may include a target model/rule 101, and the preprocessing module 113 and the preprocessing module 114 are optional.

The data collection device 160 is configured to collect training data. For a traffic anomaly detection method of an embodiment of this application, the training data may include a first time series, where the first time series includes N elements, the N elements correspond to N moments, and each of the N elements is traffic data received at a corresponding moment. After collecting the training data, the data collection device 160 stores the training data into the database 130, and the training device 120 obtains the target model/rule 101 by training based on the training data maintained in the database 130.

The following describes the training device 120 obtaining the target model/rule 101 based on the training data. The training device 120 performs traffic anomaly detection on the first time series, and compares an output traffic anomaly detection result of the first time series with an original traffic anomaly result of the first time series until the traffic anomaly detection result of the first time series that is output by the training device 120 and the original traffic anomaly result of the first time series are less than a specific threshold, thereby completing the training of the target model/rule 101. The original traffic anomaly result of the first time series is obtained by an operator through analysis of the first time series.

The foregoing target model/rule 101 can be used to implement the traffic anomaly detection method in the embodiments of this application. To be specific, a target time series (after related preprocessing) is input to the target model/rule 101, and a detection result of the target time series can be obtained. It should be noted that in actual applications, the first time series maintained in the database 130 may not all come from time series collected by the data collection device 160, and may also be from time series received from other devices. In addition, it should be noted that the training device 120 does not necessarily perform the training of the target model/rule 101 completely based on the first time series maintained in the database 130, but may also obtain the first time series from the cloud or other places for model training. The foregoing description should not be construed as a limitation to the embodiments of this application.

The target model/rule 101 obtained based on training by the training device 120 may be applied to different systems or devices, for example, to the execution device 110 shown in FIG. 1. The execution device 110 may be a server, a cloud, or the like. In FIG. 1, the execution device 110 is configured with an I/O interface 112 for data exchange with external devices. The network device 140 inputs data to the I/O interface 112, and the input data in the embodiments of this application may include a target time series input by the network device. The network device 140 herein may be a terminal device.

The preprocessing module 113 and the preprocessing module 114 are configured to perform preprocessing according to the input data (for example, the target time series) received by the I/O interface 112. In the embodiments of this application, the preprocessing module 113 and the preprocessing module 114 may not be provided (or there may be only one of the preprocessing modules), but the computing module 111 is directly used to process the input data.

When the execution device 110 preprocesses the input data, or when the computing module 111 of the execution device 110 performs computing and other related processing, the execution device 110 may invoke data, code, and the like in the data storage system 150 for corresponding processing, or may store data, instructions, and the like obtained by corresponding processing to the data storage system 150.

Finally, the I/O interface 112 presents a processing result, such as the detection result of the target time series obtained above, to the network device 140, so as to provide to a user.

It should be noted that the training device 120 may generate corresponding target models/rules 101 based on different training data for different goals or tasks, and the corresponding target models/rules 101 can be used to achieve the goals or complete the tasks, so as to provide the user with a desired result.

In the case shown in FIG. 1, the network device 140 may automatically send input data to the I/O interface 112. The user may view, on the network device 140, a result output by the execution device 110, and a specific presentation form may be a display, a sound, an action, or other specific forms. The network device 140 may alternatively serve as a data collection terminal to collect the input data input to the I/O interface 112 and the output result output from the I/O interface 112 as shown in FIG. 1 as new sample data, and store the sample data into the database 130. Certainly, it is also possible that the network device 140 is not used for collection, but the I/O interface 112 directly uses the input data input to the I/O interface 112 and the output result output from the I/O interface 112 as shown in the figure as new sample data, and stores the sample data into the database 130.

It should be noted that FIG. 1 is merely a schematic diagram of a system architecture provided in an embodiment of this application, and a positional relationship between the devices, modules, and the like shown in the figure does not constitute any limitation. For example, in FIG. 1, the data storage system 150 is an external memory relative to the execution device 110. In other cases, the data storage system 150 may also be placed in the execution device 110.

The following describes technical solutions of this application with reference to accompanying drawings.

A traffic pattern classification method 200 provided in an embodiment of this application is described in detail below with reference to FIG. 2.

The method shown in FIG. 2 may be performed by a traffic pattern classification apparatus, and the traffic pattern classification apparatus may be a server or a cloud having a traffic pattern classification function.

The method 200 shown in FIG. 2 includes steps 210 to 230. These steps are separately described in detail below.

210: Obtain a target time series, where the target time series includes N elements, the N elements correspond to N moments, and each of the N elements is traffic data received at a corresponding moment.

Optionally, the target time series may be sent by a first network device.

Optionally, the server may further obtain other time series on which traffic anomaly detection is to be performed in addition to the target time series. The other time series on which traffic anomaly detection is to be performed may be from a same network device. The same network device may be the first network device, or the same network device may be any other network device different from the first network device. Alternatively, the other time series on which traffic anomaly detection is to be performed may come from different network devices. This is not limited in this application.

Optionally, that each of the N elements is traffic data received at a corresponding moment may be understood as that each of the N elements is traffic data of the first network device in a unit time (second (s)) collected by the server. In other words, each of the N elements may be traffic data of the first network device collected by the server every is. For example, when N is 4, the target time series may include four elements, that is, the server needs to collect traffic data of the first network device every is to obtain the target time series collected within 4 s. For example, the target time series may be {1 MB, 2 MB, 5 MB, 9 MB}, where 1 megabyte (MB) is traffic data of the first network device in the 1st second, 2 MB is traffic data of the first network device in the 2nd second, 5 MB is traffic data of the first network device in the 3rd second, and 9 MB is traffic data of the first network device in the 4th second. For another example, the target time series may also be {1.2 MB, 2 MB, 3 MB, 5 MB}, where 1.2 MB is traffic data of the first network device in the 1st second, 2 MB is traffic data of the first network device in the 2nd second, 3 MB is traffic data of the first network device in the 3rd second, and 5 MB is traffic data of the first network device in the 4th second. Alternatively, that each of the N elements is traffic data received at a corresponding moment may also be understood as that each of the N elements is total traffic data of the first network device within a preset time collected by the server, where the preset time is greater than the unit time. For example, when N is 6, the target time series may include six elements, that is, the server needs to collect traffic data of the first network device every preset time to obtain the target time series within six preset times. For example, when N is 6 and the preset time is 10 s, the server collects traffic data of the first network device every 10 s to obtain the target time series collected within 1 min. For example, the target time series may be {1 MB, 2.5 MB, 5 MB, 8 MB, 12 MB, 18 MB}, where 1 MB is traffic data of the first network device in 1 s to 10 s, 2.5 MB is traffic data of the first network device in 11 s to 20 s, 5 MB is traffic data of the first network device in 21 s to 30 s, 8 MB is traffic data of the first network device in 31 s to 40 s, 12 MB is traffic data of the first network device in 41 s to 50 s, and 18 MB is traffic data of the first network device in 51 s to 60 s. For another example, when N is 5 and the preset time is 5 s, the target time series may be {1 MB, 2 MB, 3.5 MB, 6 MB, 8 MB}, where 1 MB is traffic data of the first network device in is to 5 s, 2 MB is traffic data of the first network device in 6 s to 10 s, 3.5 MB is traffic data of the first network device in 11 s to 15 s, 6 MB is traffic data of the first network device in 16 s to 20 s, and 8 MB is traffic data of the first network device in 21 s to 25 s.

220: Obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time.

Optionally, each of the N elements in the target time series is decomposed into a trend component, a periodic component, and a residual component, a first sub-time series including N periodic components and a second sub-time series including N residual components are determined, and the target parameter of the target time series is obtained based on the first time sub-series or the second time sub-series.

The N periodic components decomposed from each of the N elements in the target time series are the same, that is, each periodic component decomposed from each element in one time series is the same.

For example, $x_n$ is an element in the target time series, and $x_n$ is decomposed into a trend component $T_n$, a periodic component $S_n$, and a residual component $C_n$, where $S_n$ is an element in the first sub-time series, and $C_n$ is an element in the second sub-time series. $x_n$ may be expressed as the following formula:

$$x_n = T_n + S_n + C_n$$

Optionally, the server may decompose each of the N elements in the target time series into a trend component, a periodic component, and a residual component by using a time series decomposition (TSD) algorithm.

Optionally, whether the target time series has the periodic factor is determined based on the first sub-time series.

Further, when the N periodic components in the first sub-time series exist, it is determined that the target time series has the periodic factor, and when the N periodic components in the first sub-time series do not exist, it is determined that the target time series does not have the periodic factor.

Optionally, that the N periodic components exist may be understood as that all the N periodic components are valid values, for example, the periodic component may be 1, or the periodic component may be 3. That the N periodic components do not exist may be understood as that all the N periodic components are invalid values, for example, the periodic component may be 0. That all the N periodic components are valid values may be understood as that all the N periodic components obtained by decomposing the time series are non-zero values, and that all the N periodic components are invalid values may be understood as that all the N periodic components obtained by decomposing the time series are zero values. For example, a time series shown in FIG. 3C is a periodic time series. When the time series shown in FIG. 3C is decomposed, N periodic components of the time series obtained are zero values, that is, the N periodic components of the time series are invalid values, and therefore the periodic components do not exist. For another example, a time series shown in FIG. 3B is an aperiodic time series. When the time series shown in FIG. 3B is decomposed, N periodic components of the time series obtained are non-zero values, that is, the N periodic components of the time series are valid values, and therefore the periodic components exist.

Optionally, if the target time series has the periodic factor, the periodic factor may be set to 1, and if the target time series does not have the periodic factor, the periodic factor may be set to 0.

Optionally, the jitter density of the target time series is determined based on the second sub-time series.

Further, the server determines R of the target time series according to the following formula:

$$R = \frac{\Sigma_0^{N-1} r_n}{N}$$

where R is the jitter density, and $r_n$ can be determined according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases}$$

where $C_n$ is an $n^{th}$ element in the second sub-time series, and $x_n$ is an $n^{th}$ element in the target time series, and N is determined according to the following formula:

$$N = \left[\frac{T}{W}\right]$$

where T is a length of the target time series, W is a window length of an addition window, and a is a first preset value.

230: Classify the target time series based on the target parameter.

Further, when the periodic factor exists, the target time series is determined as periodic, and when the periodic factor does not exist, the target time series is determined as aperiodic. When the jitter density is greater than a second preset value, the target time series is determined as spiky, and when the jitter density is less than or equal to the second preset value, the target time series is determined as stationary.

When the target time series is classified based on the target parameter, there may be the following eight cases, where S is the periodic factor, and R is the jitter density:

(1) when S exists, that is, when S=1, a first type to which the target time series belongs is a periodic type;

(2) when S does not exist, that is, when S=0, the first type to which the target time series belongs is an aperiodic type;

(3) when R is greater than the second preset value, the first type to which the target time series belongs is a spiky type;

(4) when R is less than or equal to the second preset value, the first type to which the target time series belongs is a stationary type;

(5) when S exists, and R is greater than the second preset value, the first type to which the target time series belongs is a periodic and spiky type;

(6) when S does not exist, and R is greater than the second preset value, the first type to which the target time series belongs is an aperiodic and spiky type;

(7) when S exists, and R is less than or equal to the second preset value, the first type to which the target time series belongs is a periodic and stationary type; and (8) when S does not exist, and R is less than or equal to the second preset value, the first type to which the target time series belongs is an aperiodic and stationary type.

Optionally, the method 200 may further include step 240.

240: Output a classification result of the target time series. To be specific, the output classification result is that the target time series is periodic or aperiodic, or that the target time series is stationary or spiky, or the target time series is periodic and spiky, periodic and stationary, aperiodic and spiky, or aperiodic and stationary.

Figure 3A:
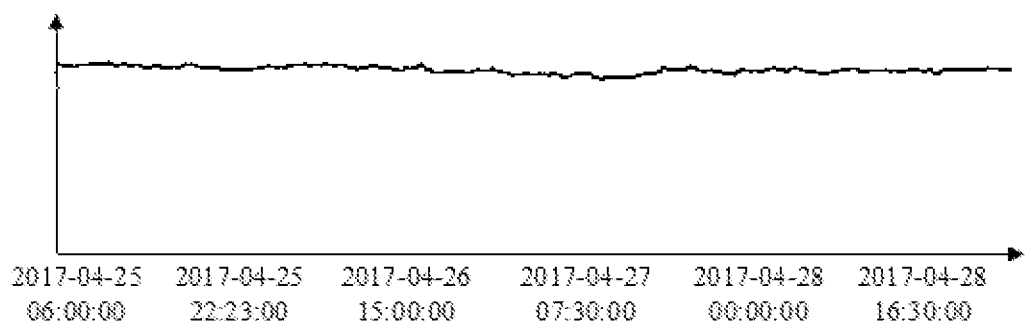
FIG. 3A, FIG. 3B, FIG. 3C, and FIG. 3D show network traffic series of four network devices.
Figure 3B:
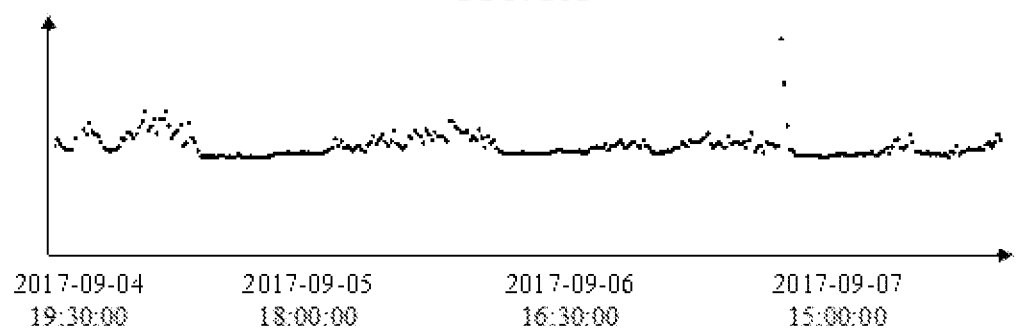
Figure 3C:
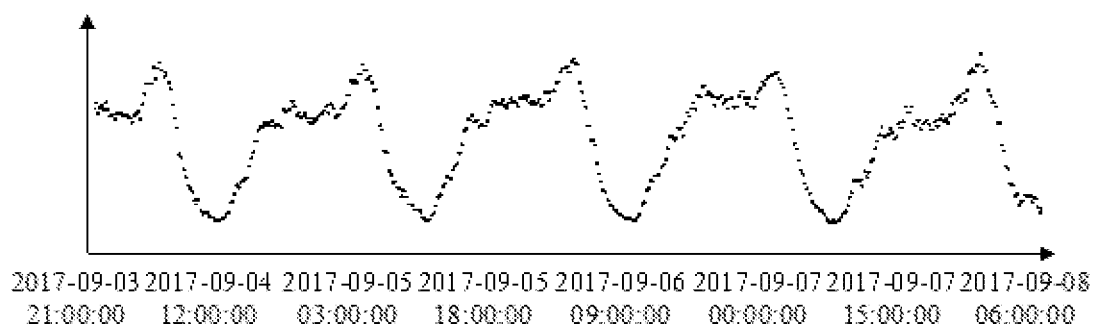
Figure 3D:
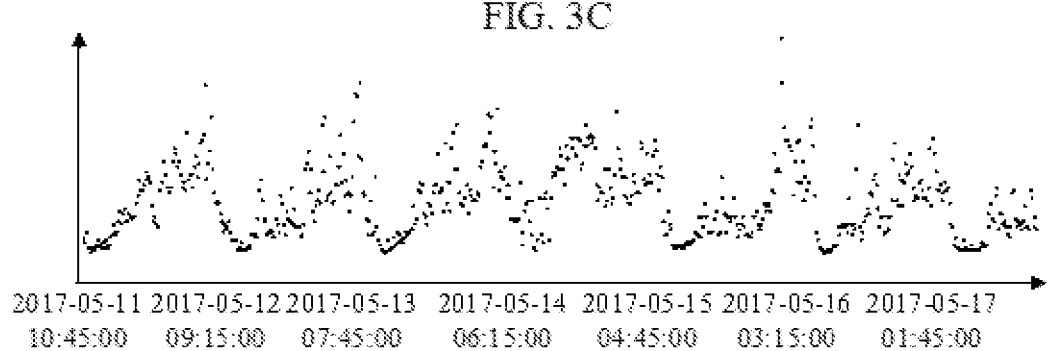

For example, FIG. 3A, FIG. 3B, FIG. 3C, and FIG. 3D show network traffic series of four network devices. It can be seen from FIG. 3A, FIG. 3B, FIG. 3C, and FIG. 3D that characteristics of network traffic vary greatly. Traffic of a network device shown in FIG. 3A is relatively stationary at each moment, that is, the traffic series may be stationary, traffic of a network device shown in FIG. 3B has an evident local traffic jitter, that is, the traffic series may be spiky, traffic of a network device shown in FIG. 3C presents extremely strong periodic characteristics (daily and weekly), that is, the traffic series may be periodic, and traffic of a network device shown in FIG. 3D does not present evident periodic characteristics (daily and weekly), that is, the traffic series may be aperiodic.

The target time series is classified, so that a foundation can be laid for subsequent traffic anomaly detection on the classified target time series, thereby improving the accuracy of traffic anomaly detection on the target time series.

A traffic anomaly detection method 400 provided in an embodiment of this application is described in detail below with reference to FIG. 4.

The method shown in FIG. 4 may be performed by a traffic anomaly detection apparatus, and the traffic anomaly detection apparatus may be a server having a traffic anomaly detection function.

The method shown in FIG. 4 includes steps 410 to 440. These steps are separately described in detail below.

An anomaly of a time series described in this embodiment of this application may be understood as a traffic anomaly of the time series.

410: Obtain a target time series, where the target time series includes N elements, the N elements correspond to N moments, and each of the N elements is traffic data received at a corresponding moment.

Optionally, the target series may be sent by a first network device.

Optionally, the server may further obtain other time series on which traffic anomaly detection is to be performed in addition to the target time series. The other time series on which traffic anomaly detection is to be performed may be from a same network device. The same network device may be the first network device, or the same network device may be any other network device different from the first network device. Alternatively, the other time series on which traffic anomaly detection is to be performed may come from different network devices.

420: Obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time.

Optionally, each of the N elements in the target time series is decomposed into a trend component, a periodic component, and a residual component, a first sub-time series including N periodic components and a second sub-time series including N residual components are determined, and the target parameter of the target time series is obtained based on the first time sub-series or the second time sub-series.

For example, $x_n$ is an element in the target time series, and $x_n$ is decomposed into a trend component $T_n$, a periodic component $S_n$, and a residual component $C_n$, where $S_n$ is an element in the first sub-time series, and $C_n$ is an element in the second sub-time series. $x_n$ may be expressed as the following formula:

$$x_n = T_n + S_n + C_n$$

Optionally, the server may decompose each element in the target time series into a trend component, a periodic component, and a residual component by using a TSD algorithm.

Optionally, whether the target time series has the periodic factor is determined based on the first sub-time series.

Further, when the N periodic components in the first sub-time series exist, it is determined that the target time series has the periodic factor, and when the N periodic components in the first sub-time series do not exist, it is determined that the target time series does not have the periodic factor.

Optionally, periodic components decomposed from each element in one time series are the same, that is, one time series corresponds to one periodic component. For example, all the periodic components decomposed from each element in the time series may be 1, or all the periodic components decomposed from each element in the time series may be 2.

Optionally, that the N periodic components exist may be understood as that all the N periodic components are valid values, for example, the periodic component may be 0.5, or the periodic component may be 2. That the N periodic components do not exist may be understood as that all the N periodic components are invalid values, for example, the periodic component may be 0.

Optionally, if the target time series has the periodic factor, the periodic factor may be set to 1, and if the target time series does not have the periodic factor, the periodic factor may be set to 0.

Optionally, the jitter density of the target time series is determined based on the second sub-time series.

Further, the server determines R of the target time series according to the following formula:

$$R = \frac{\sum_0^{N-1} r_n}{N},$$

where R is the jitter density, and $r_n$ can be determined according to the following formula:

$$r_n = \begin{cases} 1, & \sqrt{\frac{\sum_n^{nW-1} C_n^2}{\sum_n^{nW-1} x_n^2}} \geq \alpha \\ 0, & \sqrt{\frac{\sum_n^{nW-1} C_n^2}{\sum_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and $\alpha$ is a first preset value.

For content not described in steps 410 and 420, refer to the descriptions of steps 210 and 220 in the foregoing method 200, and details are not described herein again.

430: Determine, from a plurality of types based on the target parameter, a first type to which the target time series belongs, where each of the plurality of types corresponds to one parameter set, and the target parameter belongs to a parameter set corresponding to the first type.

The type described above may include periodic, aperiodic, stationary, spiky, periodic and stationary, periodic and spiky, aperiodic and stationary, or aperiodic and spiky.

The periodic type and the aperiodic type may be determined based on the periodic factor. Further, when the periodic factor exists, the type is the periodic type, and when the periodic factor does not exist, the type is the aperiodic type.

The stationary type and the spiky type may be determined based on the jitter density. Further, when the jitter density is greater than a second preset value, the type is the spiky type, and when the jitter density is less than or equal to the second preset value, the type is the stationary type.

It should be understood that for the type of the target time series, there may be the following eight cases, where S is the periodic factor, and R is the jitter density: (1) when S exists, that is, when S=1, the first type to which the target time series belongs is a periodic type, (2) when S does not exist, that is, when S=0, the first type to which the target time series belongs is an aperiodic type, (3) when R is greater than the second preset value, the first type to which the target time series belongs is a spiky type, (4) when R is less than or equal to the second preset value, the first type to which the target time series belongs is a stationary type, (5) when S exists, and R is greater than the second preset value, the first type to which the target time series belongs is a periodic and spiky type, (6) when S does not exist, and R is greater than the second preset value, the first type to which the target time series belongs is an aperiodic and spiky type, (7) when S exists, and R is less than or equal to the second preset value, the first type to which the target time series belongs is a periodic and stationary type, and (8) when S does not exist, and R is less than or equal to the second preset value, the first type to which the target time series belongs is an aperiodic and stationary type.

Optionally, the parameter set may be understood as $\{S=1\}$, $\{S=0\}$, $\{R>\beta\}$, $\{R\leq\beta\}$, where $\beta$ may be the second preset value.

First, a first parameter set to which the target parameter belongs is determined from the plurality of parameter sets based on the target parameter, and then the first type to which the target time series belongs is determined from the plurality of types based on a third mapping relationship and the first parameter set, where the third mapping relationship includes correspondences between the plurality of parameter sets and the plurality of types. In other words, the target parameter is obtained through calculation, and the first parameter set is determined based on a parameter set to which the target parameter belongs, and the first type to which the target time series belongs is determined based on the first type corresponding to the first parameter set.

440: Detect an anomaly of the target time series based on a first-type decision model corresponding to the first type, where each of the plurality of types corresponds to one type of decision model, and the decision model is used for traffic anomaly detection. Optionally, the first-type decision model corresponding to the first type may be determined based on a second mapping relationship and the first type to which the target time series belongs, where the second mapping relationship includes correspondences between the plurality of types and a plurality of first-type decision models.

The first-type decision model may be as follows: first, determining a third sub-time series including N trend components, and dividing a second time series into M sub-series of a target length, where M is a positive integer, the second time series is the third sub-time series, or the second time series is formed based on the third sub-time series and a linear segmentation algorithm, e.g, PLR, then, calculating MP values of the M sub-series of the target length, where the MP values of the M sub-series of the target length constitute an MP time series, and finally, detecting an anomaly of the target time series based on the MP time series and an N-sigma algorithm.

In a PLR representation of a time series, a quantity of line segments determines an approximation granularity of an original series. A larger quantity of line segments indicates a shorter average length of the line segments, reflecting short-term fluctuations of the time series. A smaller quantity of line segments indicates a longer average length of the line segments, reflecting a medium- and long-term trend of the time series. A PLR representation method is to approximately identify a time series of length m (m>>M) by using M straight line segments connecting the consecutive vertices.

A trend component reflects overall changes of a time series. Therefore, the third sub-time series including the N trend components is used for anomaly detection, so that the accuracy of an anomaly detection result of the time series can be improved.

In this embodiment of this application, a PLR representation of the third sub-time series (a time series composed of trend components decomposed from each of the N elements in the target time series) is implemented by using a top-down algorithm. A start point and an end point of traffic data are piecewise points that are first selected. Then, all points between the two points are traversed to find a point with the largest distance from a line connecting the two points. If the distance from this point to the line is greater than a predetermined threshold, this point is used as a third piecewise point. In this case, there are two line segments, that is, two line segments from this new point to an adjacent point on the left and an adjacent point on the right. A point with the largest distance keeps being searched for, and two points are found. When one of the two points has the largest distance from a corresponding line segment, if this distance is greater than the threshold, the point is used as a fourth piecewise point. The loop is repeated until no point with a distance greater than the threshold is found, and then segmentation is completed. This threshold, namely, a distance from a point to a line segment, uses the Euclidean distance.

Optionally, the second time series is divided into the M sub-series of the target length by using a MP, and the MP values of the M sub-series of the target length are calculated by using MP. MP is a method for describing a series profile from a structure of a time series, and is often used in time series clustering, density estimation, graph discovery, and the like. The principle of MP is to split the entire time series into fixed-length sub-series, then calculate Euclidean distances between each sub-series and other sub-series, and take the minimum value as an MP value of the series. For example, a time series $X=\{x_0, x_1, \ldots x_{n-2}, x_{n-1}\}$ is divided into a number of sub-series $\hat{x}_i=\{x_1, x_{i+1}, x_{i+m-2}, x_{i+m-1}\}$ by using MP, and an MP value of the sub-series $\hat{x}_i$ and the original time series X is the minimum value of the distances between the sub-series and other sub-series in the original series, that is, $MP_i=\min(dis(\hat{x}_i, \hat{x}_j)), j \in [0, n-m]$.

Detecting an anomaly of the target time series based on the MP time series and the N-sigma algorithm is as follows:

Assuming that the MP time series may be $MP=\{mp_0, mp_1, \ldots mp_{n-m}\}$, then $$\mu_{mp} = \frac{\sum_{i=0}^{n-m} mp_i}{n-m+1}$$

$$\sigma_{mp} = \sqrt{\frac{\sum_{i=0}^{n-m}(mp_i - \mu_{mp})^2}{n-m+1}},$$

where $\mu_{mp}$ is the mean of the MP time series, and $\sigma_{mp}$ is the standard deviation of the MP time series.

If $$\frac{|mp_i - \mu_{mp}|}{\sigma_{mp}} > \delta,$$

traffic data received at a moment corresponding to an $i^{th}$ element in the target time series is anomalous data, or if $$\frac{|mp_i - \mu_{mp}|}{\sigma_{mp}} \le \delta,$$

traffic data received at a moment amp corresponding to an $i^{th}$ element in the target time series is normal data. $\delta$ is a preset value.

Based on the MP time series and the N-sigma algorithm, an anomalous traffic point in the MP time series can be detected, and a moment corresponding to the anomalous traffic point in the MP time series is a moment of an anomalous traffic point in the target time series, so that the anomalous traffic point of the target time series can be obtained based on the anomalous traffic point in the MP time series.

Figure 5:
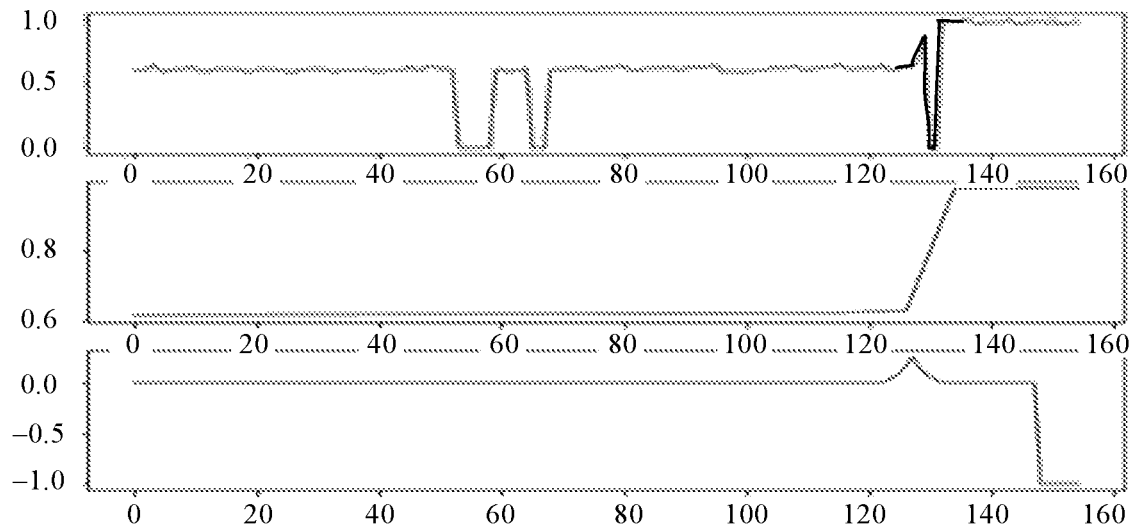
FIG. 5 is a schematic diagram of a time series after processing according to an embodiment of this application.

For example, as shown in FIG. 5, the figure above shows a graph of the original time series, the figure in the middle shows a graph of a time series obtained after the original series is represented by PLR, and the figure below shows a graph of a time series obtained after the time series represented by PLR is divided into M sub-series, and the MP values of the M sub-series are calculated. It can be seen from FIG. 5 that the original series has a sudden change when the abscissa is around 60, and after the original time series is represented by PLR, the sudden change when the abscissa is around 60 can be filled in. In practice, a traffic time series may fluctuate in a short time, but traffic returns to normal in a short time. Therefore, it is necessary to represent the time series by PLR and calculate MP values, to ensure the accuracy of traffic anomaly detection on the time series, thereby improving the accuracy of the traffic anomaly detection. Optionally, after an anomaly of the target time series is determined based on the first-type decision model corresponding to the first type, the anomalous point in the target time series may be output.

Optionally, the server may further perform another traffic anomaly detection on the target time series, that is, the server may further perform step 450.

Step 450: Detect an anomaly of the target time series based on the second sub-time series and a second-type decision model corresponding to the first type, where the second-type decision model is an N-sigma model.

The second-type decision model corresponding to the first type is determined based on a first mapping relationship and the first type to which the target time series belongs, where the first mapping relationship includes correspondences between the plurality of types and a plurality of second-type decision models.

The second-type decision model may be further as follows:

$$\mu_2 = \frac{\Sigma_0^{N-1} C_n}{T}, \text{ and}$$

$$\sigma_2 = \sqrt{\frac{\Sigma_0^{N-1}(C_n - \mu)^2}{T}},$$

where $\mu_2$ is the mean of the second sub-time series, and $\sigma_2$ is the standard deviation of the second sub-time series.

If $$\frac{|C_2 - \mu_2|}{\sigma_2} > \varphi,$$

traffic data received at a moment corresponding to an $n^{th}$ element in the target time series is anomalous data, or if $$\frac{|C_2 - \mu_2|}{\sigma_2} \leq \varphi,$$

traffic data received at a moment corresponding to an $n^{th}$ element in the target time series is normal data. $\varphi$ is a preset value.

Based on the second sub-time series and the second-type decision model corresponding to the first type, an anomalous traffic point in the second sub-time series can be detected, and a moment corresponding to the anomalous traffic point in the second sub-time series is a moment of an anomalous traffic point in the target time series, so that the anomalous traffic point of the target time series can be obtained based on the anomalous traffic point in the second sub-time series. Optionally, after an anomaly of the target time series is determined based on the second sub-time series and the second-type decision model corresponding to the first type, the anomalous point in the target time series may be output.

In the foregoing embodiment, anomaly detection is performed based on a type of the time series and a decision model corresponding to the type of the time series, where each type of time series corresponds to a type of decision model, that is, each type of time series has a first-type decision model and a second-type decision model corresponding to the type of time series. For example, for a periodic time series, there is a corresponding first-type decision model, and there is also a corresponding second-type decision model, for an aperiodic time series, there is a corresponding first-type decision model, and there is also a corresponding second-type decision model. Therefore, time series anomaly detection may be performed for each type of time series and a decision model corresponding to each type of time series, thereby improving the accuracy of time series anomaly detection.

Another traffic anomaly detection method 600 provided in an embodiment of this application is described in detail below with reference to FIG. 6.

Figure 6:
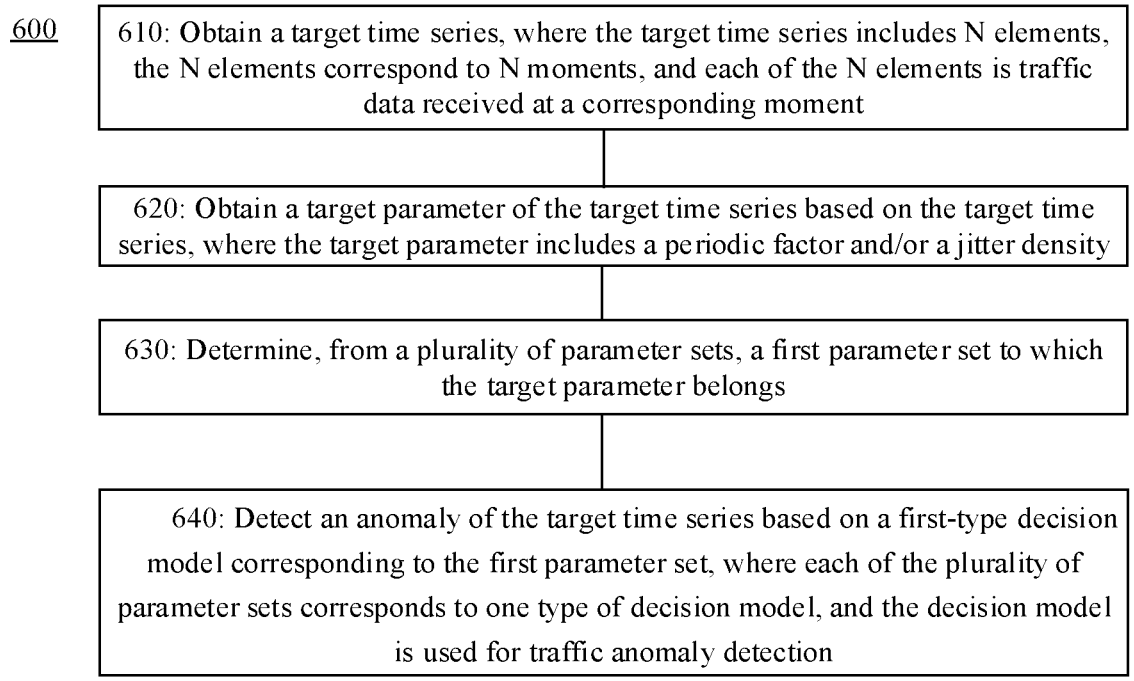
FIG. 6 is a schematic flowchart of another traffic anomaly detection method according to an embodiment of this application.

The method shown in FIG. 6 may be performed by a traffic anomaly detection apparatus, and the traffic anomaly detection apparatus may be a server having a traffic anomaly detection function.

The method shown in FIG. 6 includes steps 610 to 640. These steps are separately described in detail below.

610: Obtain a target time series, where the target time series includes N elements, the N elements correspond to N moments, and each of the N elements is traffic data received at a corresponding time point.

620: Obtain a target parameter of the target time series based on the target time series, where the target parameter includes a periodic factor and/or a jitter density, the periodic factor is used to represent a wave-shaped change that is presented in the target time series and that is about a long-term trend, and the jitter density is used to represent a deviation between an actual value and a target value of the target time series within a target time.

Optionally, each of the N elements in the target time series is decomposed into a trend component, a periodic component, and a residual component, a first sub-time series including N periodic components and a second sub-time series including N residual components are determined, and the target parameter of the target time series is obtained based on the first time sub-series or the second time sub-series.

Optionally, whether the target time series has the periodic factor is determined based on the first sub-time series.

Further, when the N periodic components in the first sub-time series exist, it is determined that the target time series has the periodic factor, and when the N periodic components in the first sub-time series do not exist, it is determined that the target time series does not have the periodic factor.

Optionally, when the target time series has the periodic factor, the periodic factor S may be equal to 1 by default, and when the target time series does not have the periodic factor, the periodic factor S may be equal to 0 by default.

Optionally, the jitter density of the target time series is determined based on the second sub-time series.

Further, the server determines R of the target time series according to the following formula:

$$R = \frac{\Sigma_0^{N-1} r_n}{N},$$

where R is the jitter density, and $r_n$ can be determined according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the target time series, W is a window length of an addition window, and $\alpha$ is a first preset value.

For content not described in steps 610 and 620, refer to the descriptions of steps 210 and 220 in the foregoing method 200, and details are not described herein again.

630: Determine, from a plurality of parameter sets, a first parameter set to which the target parameter belongs.

Optionally, the plurality of parameter sets may be {S=1}, {S=0}, {R>β}, {R≤β}.

For example, when β is equal to 2, if the determined jitter density of the target time series is 4, it can be determined that the first parameter set is {R>β}, and if the determined jitter density of the target time series is 1, it can be determined that the first parameter set is {R≤β}.

For example, when the target series has the periodic factor, S=1, that is, the first parameter set is {S=1}, and when the target series does not have the periodic factor, S=0, that is, the first parameter set is {S=0}.

640: Detect an anomaly of the target time series based on a first-type decision model corresponding to the first parameter set, where each of the plurality of parameter sets corresponds to one type of decision model, and the decision model is used for traffic anomaly detection.

Optionally, a first-type decision model corresponding to the first parameter set is determined based on a fifth mapping relationship and the first parameter set to which the target parameter belongs, where the fifth mapping relationship includes correspondences between the plurality of parameter sets and the plurality of first-type decision models.

Further, a third sub-time series including N trend components is determined, a second time series is divided into M sub-series of a target length, where M is a positive integer, the second time series is the third sub-time series, or the second time series is formed based on the third sub-time series and a linear segmentation algorithm, e.g. PLR, MP values of the M sub-series of the target length are calculated, where the MP values of the M sub-series of the target length constitute an MP time series, and an anomaly of the target time series is determined based on the MP time series and an N-sigma algorithm.

Based on the MP time series and the N-sigma algorithm, an anomalous traffic point in the MP time series can be detected, and a moment corresponding to the anomalous traffic point in the MP time series is a moment of an anomalous traffic point in the target time series, so that the anomalous traffic point of the target time series can be obtained based on the anomalous traffic point in the MP time series.

Optionally, after an anomaly of the target time series is determined based on the first-type decision model corresponding to the first parameter set, the anomalous point in the target time series may be output.

Optionally, the foregoing method 600 may further include step 650.

650: Detect an anomaly of the target time series based on the second sub-time series and a second-type decision model corresponding to the first parameter set, where the second-type decision model is an N-sigma model.

The second-type decision model corresponding to the first parameter set is determined based on a fourth mapping relationship and the first parameter set to which the target parameter belongs, where the fourth mapping relationship includes correspondences between the plurality of parameter sets and a plurality of second-type decision models.

Based on the second sub-time series and the second-type decision model corresponding to the first parameter set, an anomalous traffic point in the second sub-time series can be detected, and a moment corresponding to the anomalous traffic point in the second sub-time series is a moment of an anomalous traffic point in the target time series, so that the anomalous traffic point of the target time series can be obtained based on the anomalous traffic point in the second sub-time series.

Optionally, after an anomaly of the target time series is determined based on the second-type decision model corresponding to the first parameter set, the anomalous point in the target time series may be output.

Figure 7:
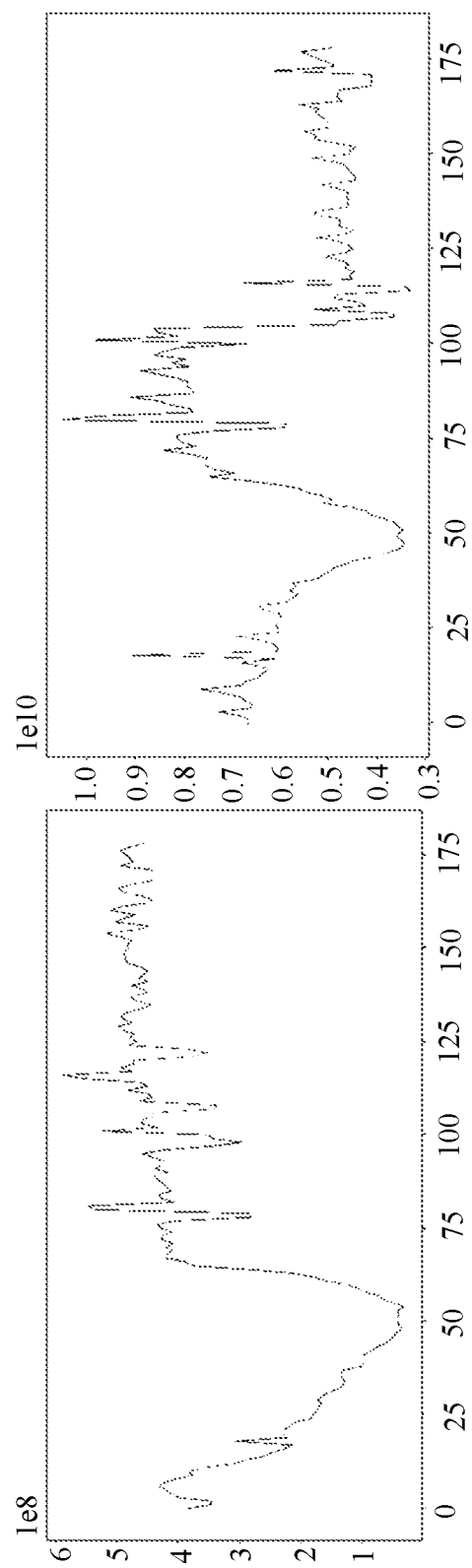
FIG. 7 is a schematic diagram of a baseline traffic anomaly according to an embodiment of this application.

As shown in FIG. 7, due to a service handover or a device failure, port traffic undergoes long-term overall changes. Such an anomaly can be classified as a baseline traffic anomaly. Therefore, an embodiment of this application provides another traffic anomaly detection method 800, to perform baseline traffic anomaly detection. Another traffic anomaly detection method 800 provided in an embodiment of this application is described in detail below with reference to FIG. 8.

The method shown in FIG. 8 may be performed by a traffic anomaly detection apparatus, and the traffic anomaly detection apparatus may be a server having a traffic anomaly detection function.

The method described in FIG. 8 includes steps 810 to 840. These steps are separately described in detail below.

810: Obtain a target time series, where the target time series includes N elements, the N elements correspond to N moments, and each of the N elements is traffic data received at a corresponding moment.

820: Decompose each of the N elements in the target time series into a trend component, a periodic component, and a residual component, and determine a third sub-time series including N trend components.

Optionally, each of the N elements in the target time series is decomposed, based on a TSD algorithm, into a trend component, a periodic component, and a residual component.

830: Divide a second time series into M sub-series of a target length, where M is a positive integer, the second time series is the third sub-time series, or the second time series is formed based on the third sub-time series and a linear segmentation algorithm PLR.

Optionally, the target length is specified by a communications protocol.

840: Calculate MP values of the M sub-series of the target length, where the MP values of the M sub-series of the target length constitute an MP time series.

For content not described in steps 810 and 840, refer to the descriptions of corresponding steps in the foregoing method 400, and details are not described herein again.

850: Detect an anomaly of the MP time series based on a third-type decision model.

The third-type decision model is an N-sigma model.

Based on the MP time series and the third-type decision model, an anomalous traffic point in the MP time series can be detected, and a moment corresponding to the anomalous traffic point in the MP time series is a moment of an anomalous traffic point in the target time series, so that the anomalous traffic point of the target time series can be obtained based on the anomalous traffic point in the MP time series.

Optionally, after an anomaly of the MP time series is detected based on the MP time series and the third-type decision model, a traffic anomaly of the target time series can be obtained, and then an anomalous point in the target time series may be output.

The foregoing method 800 may further include step 860.

860: Determine a second sub-time series including N residual components, and detect an anomaly of the second sub-time series based on the second sub-time series and the third-type decision model, where the second sub-time series is a time series formed by residual components decomposed from each of the N elements in the target time series.

Based on the second sub-time series and the third-type decision model, an anomalous traffic point in the second sub-time series can be detected, and a moment corresponding to the anomalous traffic point in the second sub-time series is a moment of an anomalous traffic point in the target time series, so that the anomalous traffic point of the target time series can be obtained based on the anomalous traffic point in the second sub-time series.

Then, after an anomaly of the second sub-time series is detected based on the third-type decision model, the anomalous point in the second sub-time series may be output.

The traffic pattern classification method in the embodiments of this application is described in detail above with reference to FIG. 2, and the traffic anomaly detection method in the embodiments of this application is described in detail above with reference to FIG. 4 to FIG. 8. A training method for a traffic pattern classification model provided in the embodiments of this application is described in detail below with reference to FIG. 9, and a training method for a traffic anomaly detection model provided in the embodiments of this application are described in detail below with reference to FIG. 10 to FIG. 12.

FIG. 9 is a schematic flowchart of a training method 900 for a traffic pattern classification model according to an embodiment of this application. The method shown in FIG. 9 may be performed by a device, such as a computer device, a server device, or a computing device, that has relatively strong computing capabilities. The method shown in FIG. 9 includes steps 910 to 940, and these steps are separately described in detail below.

910: Obtain a first time series, where the first time series includes N elements, the N elements correspond to N moments, and each of the N elements is traffic data received at a corresponding moment.

Optionally, that each element in the first time series is traffic data received at a corresponding moment may be understood as that each element in the first time series is historical traffic data received at the corresponding moment.

Optionally, a plurality of first time series may be obtained.

920: Obtain a first type of the first time series based on an original classification model of the first time series.

Optionally, steps of the original classification model include step 1 to step 4.

Step 1: Decompose, based on a TSD algorithm, each of the N elements in the first time series into a trend component, a periodic component, and a residual component, and determine a first sub-time series including N periodic components and a second sub-time series including N residual components.

Step 2: Determine a periodic factor of the first time series based on the N periodic components in the first sub-time series. When the N periodic components in the first sub-time series exist, it is determined that the first sub-time series has the periodic factor, and the periodic factor may be determined as 1, and when the N periodic components in the first sub-time series do not exist, it is determined that the first sub-time series does not have the periodic factor, and the periodic factor may be determined as 0.

Step 3: Determine a jitter density of the first time series based on the N residual components in the second sub-time series.

Further, R of the first time series is determined according to the following formula:

$$R = \frac{\Sigma_0^{N-1} r_n}{N},$$

where R is the jitter density, and $r_n$ can be determined according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the first time series, W is a window length of an addition window, and $\alpha$ is a first preset value.

Step 4: Determine the first type of the first time series based on the periodic factor S and the jitter density R.

When S exists, the first type of the first time series is a periodic type, when S does not exist, the first type of the first time series is an aperiodic type, when R is greater than a second preset value, the first type of the first time series is a spiky type, when R is less than or equal to the second preset value, the first type of the first time series is a stationary type, when S exists, and R is greater than the second preset value, the first type of the first time series is a periodic and spiky type, when S exists, and R is less than or equal to the second preset value, the first type of the first time series is a periodic and stationary type, when S does not exist, and R is greater than the second preset value, the first type of the first time series is an aperiodic and spiky type, and when S does not exist, and R is less than or equal to the second preset value, the first type of the first time series is an aperiodic and stationary type.

930: Obtain an original type of the first time series.

940: Adjust parameters of an original model of the first time series based on the original type of the first time series and the first type of the first time series, to obtain a target classification model of the first time series.

When the original type of the first time series is inconsistent with the first type of the first time series, the parameters of the original model of the first time series are adjusted, where the parameters of the original model of the first time series include a first preset value and a second preset value. If the original type of the first time series is the spiky type, and the first type of the first time series is the stationary type, the first preset value may be adjusted to be smaller accordingly, or the second preset value may be adjusted to be smaller accordingly.

Optionally, a server may obtain a plurality of first time series, and train the target classification model of the first time series based on the plurality of first time series, that is, constantly optimize the target classification model of the first time series based on the plurality of first time series.

FIG. 10 is a schematic flowchart of a training method 1000 for a traffic anomaly detection model according to an embodiment of this application. The method shown in FIG. 10 may be performed by a device, such as a computer device, a server device, or a computing device, that has relatively strong computing capabilities. The method shown in FIG. 10 includes steps 1010 to 1050, and these steps are separately described in detail below.

1010: Obtain a first time series, where the first time series includes N elements, the N elements correspond to N moments, and each of the N elements is traffic data received at a corresponding moment.

Optionally, that each element in the first time series is traffic data received at a corresponding moment may be understood as that each element in the first time series is historical traffic data received at the corresponding moment.

Optionally, a plurality of first time series may be obtained.

1020: Obtain a first type of the first time series based on an original classification model of the first time series.

Optionally, steps of the original classification model include step 1 to step 4.

Step 1: Decompose, based on a TSD algorithm, each of the N elements in the first time series into a trend component, a periodic component, and a residual component, and determine a first sub-time series including N periodic components and a second sub-time series including N residual components.

Step 2: Determine a periodic factor of the first time series based on the N periodic components in the first sub-time series. When the N periodic components in the first sub-time series exist, it is determined that the first sub-time series has the periodic factor, and the periodic factor may be determined as 1, and when the N periodic components in the first sub-time series do not exist, it is determined that the first sub-time series does not have the periodic factor, and the periodic factor may be determined as 0.

Step 3: Determine a jitter density of the first time series based on the N residual components in the second sub-time series.

Further, R of the first time series is determined according to the following formula:

$$R = \frac{\sum_{0}^{N-1} r_n}{N},$$

where R is the jitter density, and $r_n$ can be determined according to the following formula:

$$r_n = \begin{cases} 1, & \sqrt{\frac{\sum_{n}^{nW-1} C_n^2}{\sum_{n}^{nW-1} x_n^2}} \geq \alpha \\ 0, & \sqrt{\frac{\sum_{n}^{nW-1} C_n^2}{\sum_{n}^{nW-1} x_n^2}} < \alpha \end{cases},$$

where $C_n$ is an $n^{th}$ element in the second sub-time series, an $x_n$ is an $n^{th}$ element in the target time series, and N is determined according to the following formula:

$$N = \left[\frac{T}{W}\right],$$

where T is a length of the first time series, W is a window length of an addition window, and $\alpha$ is a first preset value.

Step 4: Determine the first type of the first time series based on the periodic factor S and the jitter density R.

When S exists, the first type of the first time series is a periodic type; when S does not exist, the first type of the first time series is an aperiodic type; when R is greater than a second preset value, the first type of the first time series is a spiky type; when R is less than or equal to the second preset value, the first type of the first time series is a stationary type; when S exists, and R is greater than the second preset value, the first type of the first time series is a periodic and spiky type; when S exists, and R is less than or equal to the second preset value, the first type of the first time series is a periodic and stationary type; when S does not exist, and R is greater than the second preset value, the first type of the first time series is an aperiodic and spiky type; and when S does not exist, and R is less than or equal to the second preset value, the first type of the first time series is an aperiodic and stationary type.

1030: Perform traffic anomaly detection on the first time series of the first type based on a first-type decision model corresponding to the first type, to obtain first data, where the first data is an anomalous point in the first time series.

Optionally, steps of the first-type decision model include step A to step D.

Step A: Determine a third sub-time series including N trend components.

Step B: Divide a second time series into M sub-series of a target length, where M is a positive integer, the second time series is the third sub-time series, or the second time series is formed based on the third sub-time series and a linear segmentation algorithm PLR.

Step C: Calculate MP values of the M sub-series of the target length, where the MP values of the M sub-series of the target length constitute an MP time series.

Step D: Detect an anomaly of the first time series based on the MP time series and an N-sigma algorithm.

1040: Obtain second data, where the second data is an original anomalous point in the first time series.

1050: Adjust a parameter of the first-type decision model based on the first data and the second data, to obtain a first target decision model.

When the first data is inconsistent with the second data, a parameter of an original model of the first time series is adjusted, where the parameter of the original model of the first time series includes a sensitivity. If a quantity of pieces of data in the first data is greater than a quantity of pieces of data in the second data, the sensitivity of the original model of the first time series may be lowered accordingly; if the quantity of pieces of data in the first data is less than the quantity of pieces of data in the second data, the sensitivity of the original model of the first time series may be increased accordingly; and if the quantity of pieces of data in the first data is equal to the quantity of pieces of data in the second data, there is no need to adjust the sensitivity of the original model of the first time series.

Optionally, a server may obtain a plurality of first time series, and train the first target decision model based on the plurality of first time series, that is, constantly optimize the first target decision model based on the plurality of first time series.

FIG. 11 is a schematic flowchart of another training method 1100 for a traffic anomaly detection model according to an embodiment of this application. The method shown in FIG. 11 may be performed by a device, such as a computer device, a server device, or a computing device, that has relatively strong computing capabilities. The method shown in FIG. 11 includes steps 1110 to 1150, and these steps are separately described in detail below.

1110: Obtain a first time series, where the first time series includes N elements, the N elements correspond to N moments, and each of the N elements is traffic data received at a corresponding moment.

Optionally, that each element in the first time series is traffic data received at a corresponding moment may be understood as that each element in the first time series is historical traffic data received at the corresponding moment.

Optionally, a plurality of first time series may be obtained.

1120: Obtain a first parameter set of the first time series based on an original parameter model of the first time series.

Optionally, the original parameter model of the first time series decision model may include step a to step d.

Step a: Decompose, based on a TSD algorithm, each of the N elements in the first time series into a trend component, a periodic component, and a residual component, and determine a first sub-time series including N periodic components and a second sub-time series including N residual components.

Step b: Determine a periodic factor of the first time series based on the N periodic components in the first sub-time series. When the N periodic components in the first sub-time series exist, it is determined that the first sub-time series has the periodic factor, and the periodic factor may be determined as 1; and when the N periodic components in the first sub-time series do not exist, it is determined that the first sub-time series does not have the periodic factor, and the periodic factor may be determined as 0.

Step c: Determine a jitter density of the first time series based on the N residual components in the second sub-time series.

Further, R of the first time series is determined according to the following formula:

$$R = \frac{\Sigma_0^{N-1} r_n}{N},$$

where R is the jitter density, and $r_n$ can be determined according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases},$$

where $C_n$ is an $n^{th}$ element in the second sub-time series, and $x_n$ is an $n^{th}$ element in the target time series, and N is determined according to the following formula:

$$N = \left[\frac{T}{W}\right],$$

where T is a length of the first time series, W is a window length of an addition window, and α is a first preset value.

Step d: Determine the first parameter set of the first time series based on the periodic factor S and the jitter density R. The parameter set is {S=1}, {S=0}, {R>β}, {R≤β}.

1130: Perform traffic anomaly detection on the first time series based on a first-type decision model corresponding to the first parameter set, to obtain fourth data, where the fourth data is an anomalous point in the first time series.

Optionally, steps of the first-type decision model include step A to step D.

Step A: Determine a third sub-time series including N trend components.

Step B: Divide a second time series into M sub-series of a target length, where M is a positive integer, the second time series is the third sub-time series, or the second time series is formed based on the third sub-time series and a linear segmentation algorithm PLR.

Step C: Calculate MP values of the M sub-series of the target length, where the MP values of the M sub-series of the target length constitute an MP time series.

Step D: Detect an anomaly of the first time series based on the MP time series and an N-sigma algorithm.

1140: Obtain first data, where the first data is an original anomalous point in the first time series.

1150: Adjust a parameter of the first-type decision model based on the first data and the fourth data, to obtain a first target decision model.

When the first data is inconsistent with the fourth data, the parameter of the first-type decision model is adjusted, where the parameter of the first-type decision model includes a sensitivity. If a quantity of pieces of data in the first data is greater than a quantity of pieces of data in the fourth data, the sensitivity of the first-type decision model may be lowered accordingly, if the quantity of pieces of data in the first data is less than the quantity of pieces of data in the fourth data, the sensitivity of the first-type decision model may be increased accordingly, and if the quantity of pieces of data in the first data is equal to the quantity of pieces of data in the fourth data, there is no need to adjust the sensitivity of the first-type decision model.

Optionally, a server may obtain a plurality of first time series, and train the first target decision model based on the plurality of first time series, that is, constantly optimize the first target decision model based on the plurality of first time series.

Figure 12:
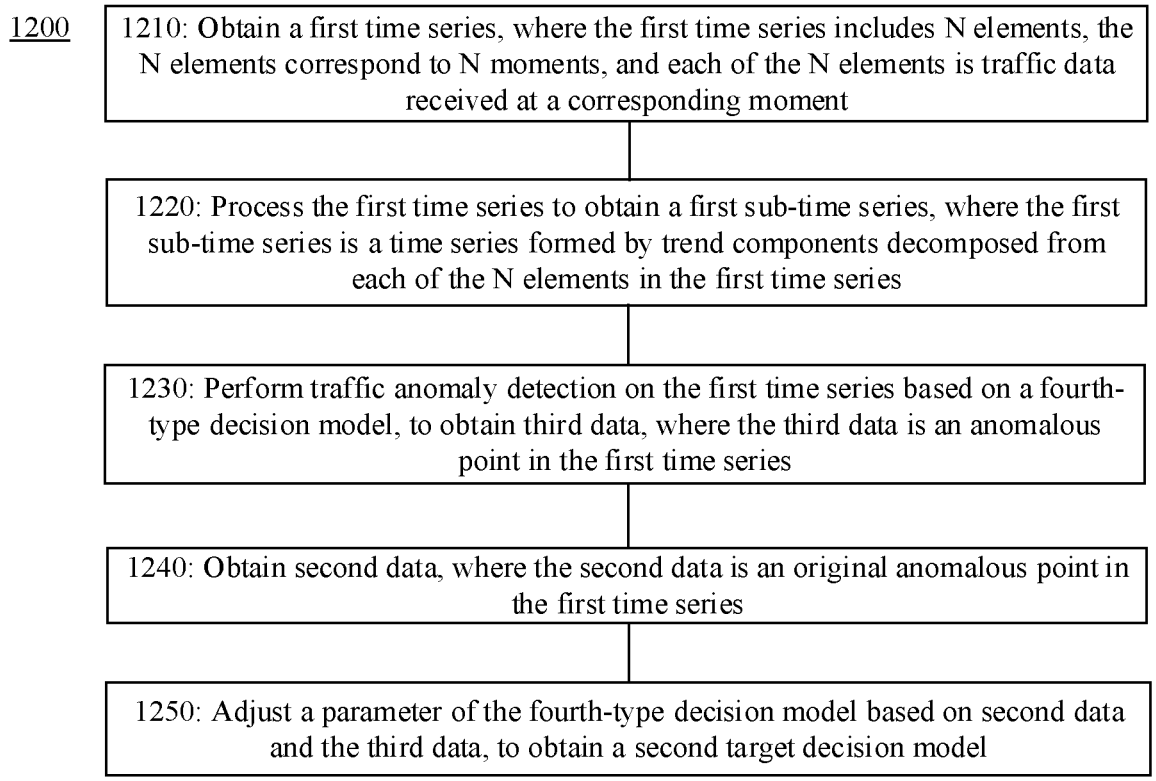
FIG. 12 is a schematic flowchart of still another training method for a traffic anomaly detection model according to an embodiment of this application.

FIG. 12 is a schematic flowchart of still another training method 1200 for a traffic anomaly detection model according to an embodiment of this application. The method shown in FIG. 12 may be performed by a device, such as a computer device, a server device, or a computing device, that has relatively strong computing capabilities. The method shown in FIG. 12 includes steps 1210 to 1250, and these steps are separately described in detail below.

1210: Obtain a first time series, where the first time series includes N elements, the N elements correspond to N moments, and each of the N elements is traffic data received at a corresponding moment.

Optionally, that each element in the first time series is traffic data received at a corresponding moment may be understood as that each element in the first time series is historical traffic data received at the corresponding moment.

Optionally, a plurality of first time series may be obtained.

1220: Process the first time series to obtain a third sub-time series, where the third sub-time series is a time series formed by trend components decomposed from each of the N elements in the first time series.

Optionally, each of the N elements in the first time series is decomposed, based on a TSD algorithm, into a trend component, a periodic component, and a residual component, and the third sub-time series including N trend components is determined.

1230: Perform traffic anomaly detection on the first time series based on a fourth-type decision model, to obtain third data, where the third data is an anomalous point in the first time series.

The fourth-type decision model includes step A' to step D'.

Step A': Determine a third sub-time series including N trend components.

Step B': Divide a second time series into M sub-series of a target length, where M is a positive integer, the second time series is the third sub-time series, or the second time series is formed based on the third sub-time series and a linear segmentation algorithm PLR.

Step C': Calculate MP values of the M sub-series of the target length, where the MP values of the M sub-series of the target length constitute an MP time series.

Step D': Detect an anomaly of the first time series based on the MP time series and an N-sigma algorithm.

1240: Obtain second data, where the second data is an original anomalous point of the first time series.

1250: Adjust a parameter of the fourth-type decision model based on the second data and the third data, to obtain a second target decision model.

When the third data is inconsistent with the second data, the parameter of the fourth-type decision model is adjusted, where the parameter of the fourth-type decision model includes a sensitivity. If a quantity of pieces of data in the third data is greater than a quantity of pieces of data in the second data, the sensitivity of the fourth-type decision model may be lowered accordingly, if the quantity of pieces of data in the third data is less than the quantity of pieces of data in the second data, the sensitivity of the fourth-type decision model may be increased accordingly, and if the quantity of pieces of data in the third data is equal to the quantity of pieces of data in the second data, there is no need to adjust the sensitivity of the fourth-type decision model.

Optionally, a server may obtain a plurality of first time series, and train the second target decision model based on the plurality of first time series, that is, constantly optimize the second target decision model based on the plurality of first time series.

Figure 13:
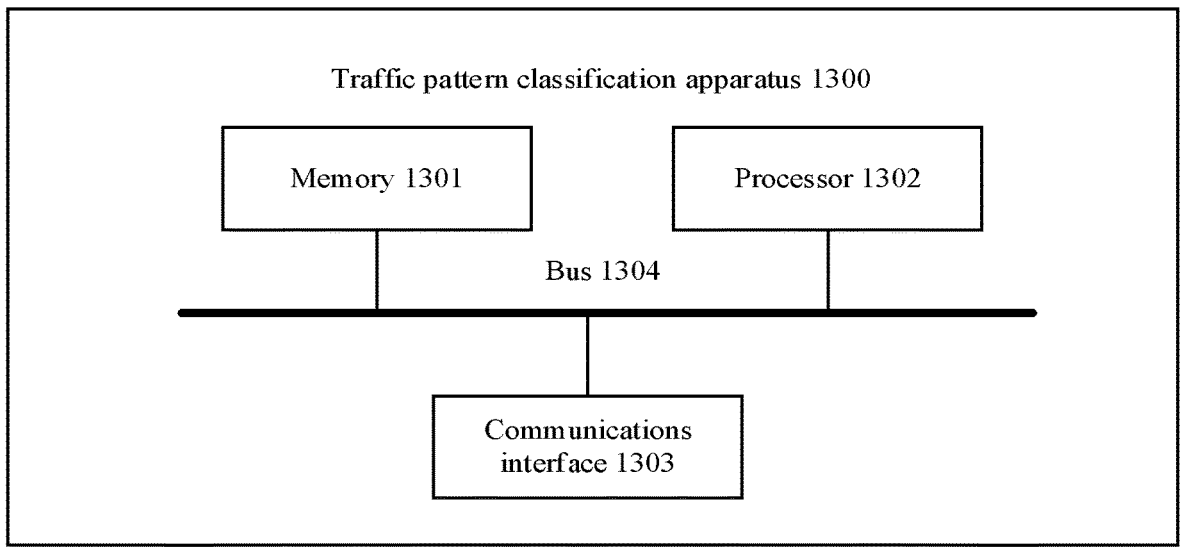
FIG. 13 is a schematic block diagram of a traffic pattern classification apparatus according to an embodiment of this application.

FIG. 13 is a schematic block diagram of a traffic pattern classification apparatus 1300 according to an embodiment of this application. The traffic pattern classification apparatus 1300 shown in FIG. 13 includes a memory 1301, a processor 1302, a communications interface 1303, and a bus 1304. The memory 1301, the processor 1302, and the communications interface 1303 are communicatively connected to each other through the bus 1304.

The memory 1301 may be a read-only memory (ROM), a static storage device, a dynamic storage device, or a random-access memory (RAM). The memory 1301 may store a program, and when the program stored in the memory 1301 is executed by the processor 1302, the processor 1302 and the communications interface 1303 are configured to perform the steps of the traffic pattern classification method in the embodiments of this application. Further, the communications interface 1303 may obtain a target time series from the memory or other devices, and then the processor 1302 classifies the target time series.

The processor 1302 may be a general-purpose central processing unit (CPU), a microprocessor, an ASIC, a graphics processing unit (GPU), or one or more integrated circuits, to execute related programs to implement functions required to be performed by units in the traffic pattern classification apparatus in the embodiments of this application, or perform the traffic pattern classification method in the embodiments of this application.

The processor 1302 may alternatively be an integrated circuit chip and has a signal processing capability. In an implementation process, the steps of the traffic pattern classification method in the embodiments of this application may be completed by a hardware integrated logic circuit or instructions in the form of software in the processor 1302.

The foregoing processor 1302 may alternatively be a general-purpose processor, a digital signal processor (DSP), an ASIC, an FPGA or another programmable logic device, a discrete gate or transistor logic device, or a discrete hardware component. The foregoing general-purpose processor may be a microprocessor or the processor may alternatively be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1301. The processor 1302 reads information in the memory 1301, and combines its hardware to complete the functions required to be performed by the units included in the traffic pattern classification apparatus in the embodiments of this application, or perform the traffic pattern classification method in the embodiments of this application.

The communications interface 1303 uses a transceiving apparatus such as, but not limited to, a transceiver to implement communication between the apparatus 1300 and other devices or communications networks. For example, the target time series may be obtained through the communications interface 1303.

The bus 1304 may include a path for transferring information between various components (for example, the memory 1301, the processor 1302, and the communications interface 1303) of the apparatus 1300.

Figure 14:
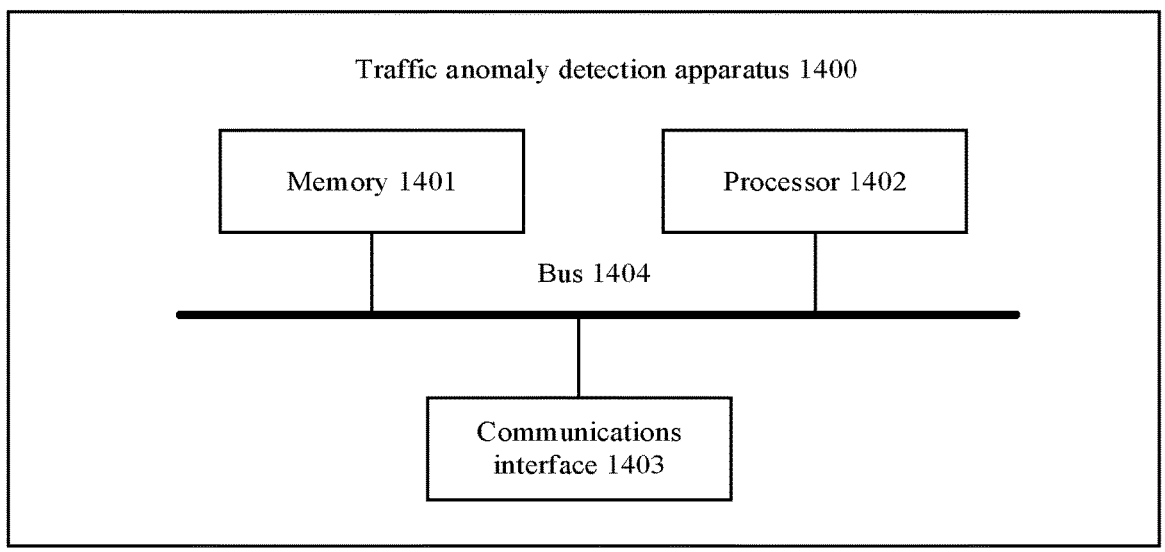
FIG. 14 is a schematic block diagram of a traffic anomaly detection apparatus according to an embodiment of this application.

FIG. 14 is a schematic block diagram of a traffic anomaly detection apparatus 1400 according to an embodiment of this application. The traffic anomaly detection apparatus 1400 shown in FIG. 14 includes a memory 1401, a processor 1402, a communications interface 1403, and a bus 1404. The memory 1401, the processor 1402, and the communications interface 1403 are communicatively connected to each other through the bus 1404.

The memory 1401 may be a ROM, a static storage device, a dynamic storage device, or a RAM. The memory 1401 may store a program, and when the program stored in the memory 1401 is executed by the processor 1402, the processor 1402 and the communications interface 1403 are configured to perform the steps of the traffic anomaly detection method in the embodiments of this application. Further, the communications interface 1403 may obtain a target time series from the memory or other devices, and then the processor 1402 classifies the target time series.

The processor 1402 may be a general-purpose CPU, a microprocessor, an ASIC, a GPU, or one or more integrated circuits, to execute related programs to implement functions required to be performed by units in the traffic anomaly detection apparatus in the embodiments of this application, or perform the traffic pattern classification method in the embodiments of this application.

The processor 1402 may alternatively be an integrated circuit chip and has a signal processing capability. In an implementation process, the steps of the traffic anomaly detection method in the embodiments of this application may be completed by a hardware integrated logic circuit or instructions in the form of software in the processor 1402.

The foregoing processor 1402 may alternatively be a general-purpose processor, a DSP, an ASIC, an FPGA or another programmable logic device, a discrete gate or transistor logic device, or a discrete hardware component. The foregoing general-purpose processor may be a microprocessor or the processor may alternatively be any conventional processor or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1401. The processor 1402 reads information in the memory 1401, and combines its hardware to complete the functions required to be performed by the units included in the traffic anomaly detection apparatus in the embodiments of this application, or perform the traffic anomaly detection method in the embodiments of this application.

The communications interface 1403 uses a transceiving apparatus such as, but not limited to, a transceiver to implement communication between the apparatus 1400 and other devices or communications networks. For example, the target time series may be obtained through the communications interface 1403.

The bus 1404 may include a path for transferring information between various components (for example, the memory 1401, the processor 1402, and the communications interface 1403) of the apparatus 1400.

Figure 15:
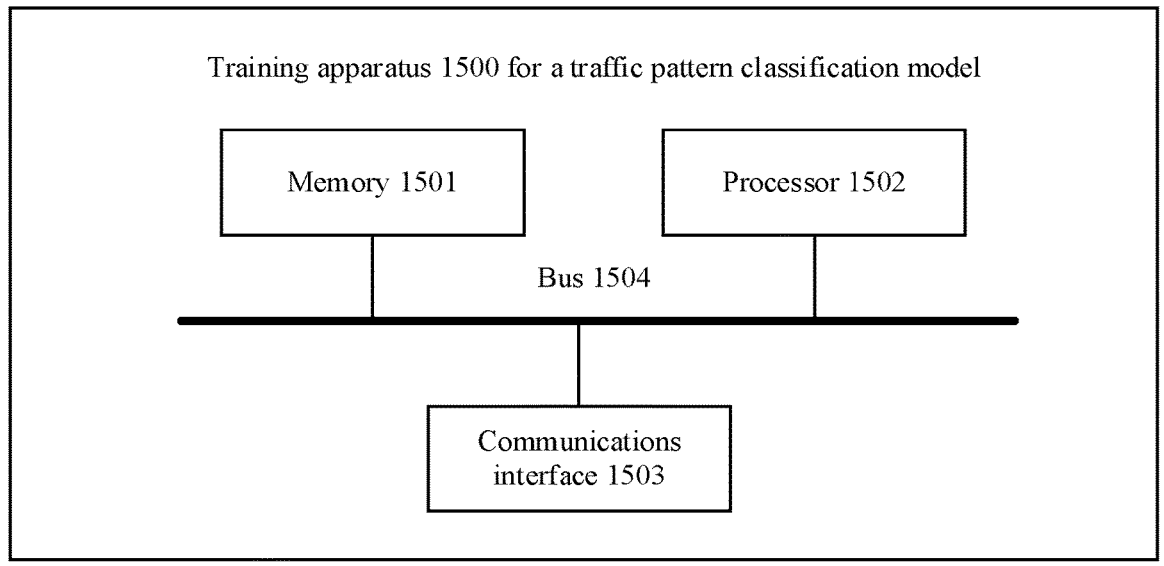
FIG. 15 is a schematic diagram of a hardware structure of a training apparatus for a traffic pattern classification model according to an embodiment of this application.

FIG. 15 is a schematic diagram of a hardware structure of a training apparatus 1500 for a traffic pattern classification model according to an embodiment of this application. Similar to the foregoing apparatus 1300, the training apparatus 1500 for a traffic pattern classification model shown in FIG. 15 may include a memory 1501, a processor 1502, a communications interface 1503, and a bus 1504. The memory 1501, the processor 1502, and the communications interface 1503 are communicatively connected to each other through the bus 1504.

The memory 1501 may store a program, and when the program stored in the memory 1501 is executed by the processor 1502, the processor 1502 is configured to perform the steps of the training method for a traffic pattern classification model in the embodiments of this application.

The processor 1502 may be a general-purpose CPU, a microprocessor, an ASIC, a GPU, or one or more integrated circuits, to execute related programs to implement the training method for a traffic pattern classification model in the embodiments of this application.

The processor 1502 may alternatively be an integrated circuit chip and has a signal processing capability. In an implementation process, the steps of the training method for a traffic pattern classification model in the embodiments of this application may be completed by a hardware integrated logic circuit or instructions in the form of software in the processor 1502.

It should be understood that the training apparatus 1500 for a traffic pattern classification model shown in FIG. 15 trains a traffic pattern classification model, and the traffic pattern classification model obtained by training can be used to perform the traffic pattern classification method in the embodiments of this application.

Further, the apparatus shown in FIG. 15 may obtain a first time series from the outside through the communications interface 1503, and then the processor trains, based on the first time series, a traffic pattern classification model to be trained.

Figure 16:
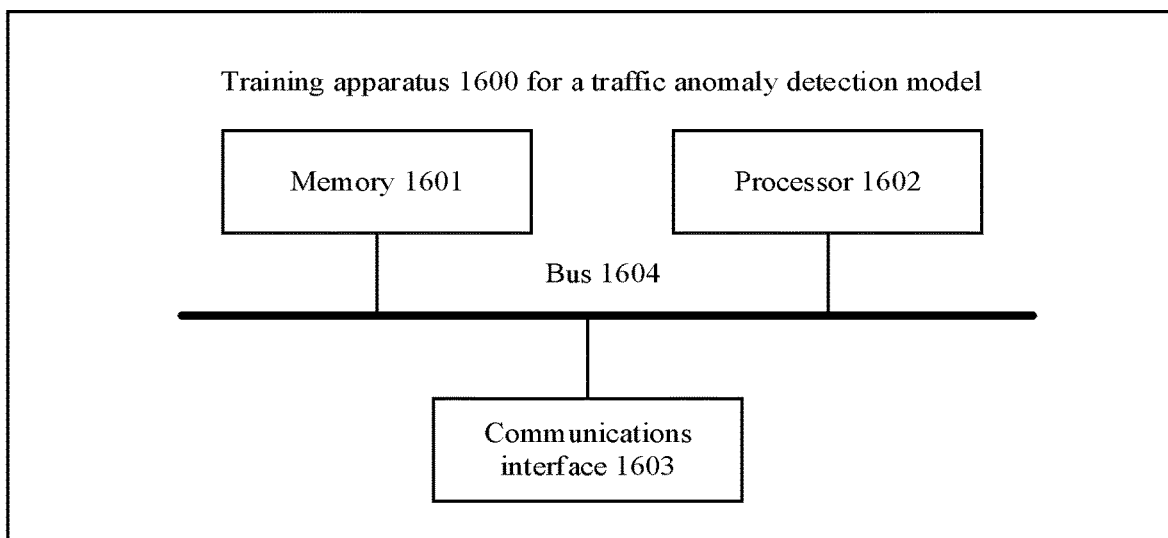
FIG. 16 is a schematic diagram of a hardware structure of a training apparatus for a traffic anomaly detection model according to an embodiment of this application.

FIG. 16 is a schematic diagram of a hardware structure of a training apparatus 1600 for a traffic anomaly detection model according to an embodiment of this application. Similar to the foregoing apparatus 1400, the training apparatus 1600 for a traffic anomaly detection model shown in FIG. 16 may include a memory 1601, a processor 1602, a communications interface 1603, and a bus 1604. The memory 1601, the processor 1602, and the communications interface 1603 are communicatively connected to each other through the bus 1604.

The memory 1601 may store a program, and when the program stored in the memory 1601 is executed by the processor 1602, the processor 1602 is configured to perform the steps of the training method for a traffic anomaly detection model in the embodiments of this application.

The processor 1602 may be a general-purpose CPU, a microprocessor, an ASIC, a GPU, or one or more integrated circuits, to execute related programs to implement the training method for a traffic anomaly detection model in the embodiments of this application.

The processor 1602 may alternatively be an integrated circuit chip and has a signal processing capability. In an implementation process, the steps of the training method for a traffic pattern classification model in the embodiments of this application may be completed by a hardware integrated logic circuit or instructions in the form of software in the processor 1602.

It should be understood that the training apparatus 1600 for a traffic anomaly detection model shown in FIG. 16 trains a traffic anomaly detection model, and the traffic anomaly detection model obtained by training can be used to perform the traffic anomaly detection method in the embodiments of this application.

Further, the apparatus shown in FIG. 16 may obtain a first time series from the outside through the communications interface 1603, and then the processor trains, based on the first time series, a traffic anomaly detection model to be trained.

It should be noted that although the apparatus 1300, the apparatus 1400, the apparatus 1500, and the apparatus 1600 described above show only a memory, a processor, and a communications interface, in a specific implementation process, persons skilled in the art should understand that the apparatus 1300, the apparatus 1400, the apparatus 1500, and the apparatus 1600 may further include other components necessary for normal operation. In addition, based on a specific requirement, a person skilled in the art should understand that the apparatus 1300, the apparatus 1400, the apparatus 1500, and the apparatus 1600 may further include hardware components that implement other additional functions. In addition, persons skilled in the art should understand that the apparatus 1300, the apparatus 1400, the apparatus 1500, and the apparatus 1600 may alternatively include only components necessary for implementing the embodiments of this application, and not necessarily include all the components shown in FIG. 13, FIG. 14, FIG. 15, and FIG. 16.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   obtaining a target time series comprising N elements, wherein the N elements correspond to N moments, and wherein each of the N elements is traffic data received at a corresponding moment;
   obtaining a target parameter of the target time series based on the target time series, wherein the target parameter comprises at least one of a periodic factor or a jitter density, wherein the periodic factor represents a wave-shaped change that is presented in the target time series and that is about a trend that represents an overall change of the target time series, and wherein the jitter density represents a deviation between an actual value of the target time series and a target value of the target time series within a target time;
   obtaining, based on a first mapping relationship and a first type of the target time series, a first-type decision model, wherein the first mapping relationship comprises correspondences between a plurality of types and a plurality of first-type decision models, wherein the first type of the target time series is based on the plurality of types and on the target parameter, wherein each of the types corresponds to one parameter set and corresponds to a type of decision model, and wherein the target parameter belongs to a parameter set that corresponds to the first type; and
   detecting an anomaly of the target time series based on the first-type decision model that corresponds to the first type.

2. The method of claim 1, further comprising:
   decomposing each of the N elements into a trend component, a periodic component, and a residual component;
   obtaining a first sub-time series comprising N periodic components and a second sub-time series comprising N residual components; and
   further obtaining the target parameter based on the first sub-time series or the second sub-time series.

3. The method of claim 2, further comprising determining, based on the first sub-time series, whether the target time series has the periodic factor.

4. The method of claim 3, wherein the target time series has the periodic factor when the N periodic components exist or the target time series does not have the periodic factor when the N periodic components do not exist.

5. The method of claim 2, further comprising:
   obtaining, based on a second mapping relationship and the first type, a second-type decision model that corresponds to the first type, wherein the second mapping relationship comprises correspondences between the plurality of types and a plurality of second-type decision models; and
   further detecting the anomaly based on the second sub-time series and the second-type decision model, wherein the second-type decision model corresponds to the first type and is an N-sigma model.

6. The method of claim 2, wherein the jitter density is based on the second sub-time series.

7. The method of claim 6, wherein the jitter density is according to the following formula:

$$R = \frac{\Sigma_0^{N-1} r_n}{N},$$

wherein R is the jitter density;
wherein $r_n$ is according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases},$$

wherein $C_n$ is an $n^{th}$ element in the second sub-time series, wherein $x_n$ is an $n^{th}$ element in the target time series; and
wherein N is according to the following formula:

$$N = \left[\frac{T}{W}\right],$$

wherein T is a length of the target time series, wherein W is a window length of an addition window, and wherein $\alpha$ is a first preset value.

8. The method of claim 1, wherein a first parameter set from a plurality of parameter sets of the target parameter is based on the target parameter, and
wherein the first type is based on a second mapping relationship and the first parameter set, wherein the second mapping relationship comprises correspondences between the parameter sets and the plurality of types.

9. The method of claim 2, wherein a third sub-time series comprises N trend components, and wherein the method further comprises:
dividing a second time series into M sub-series of a target length, wherein M is a positive integer, wherein the second time series is the third sub-time series or is formed based on the third sub-time series and a linear segmentation algorithm;
calculating matrix profile (MP) values of the M sub-series, wherein the MP values constitute an MP time series; and
further detecting the anomaly based on the MP time series and an N-sigma algorithm.

10. A method comprising:
obtaining a target time series comprising N elements, wherein the N elements correspond to N moments, and wherein each of the N elements is traffic data received at a corresponding moment;
decomposing each of the N elements into a trend component, a periodic component, and a residual component;
obtaining a first sub-time series comprising N periodic components and a second sub-time series comprising N residual components;
obtaining a target parameter of the target time series based on the first sub-time series or the second sub-time series, wherein the target parameter comprises at least one of a periodic factor or a jitter density, wherein the periodic factor represents a wave-shaped change that is presented in the target time series and that is about a trend that represents an overall change of the target time series, and wherein the jitter density is based on the second sub-time series and represents a deviation between an actual value of the target time series and a target value of the target time series within a target time; and
classifying the target time series based on the target parameter.

11. The method of claim 10, further comprising determining, based on the first sub-time series, whether the target time series has the periodic factor.

12. The method of claim 11, wherein the target time series has the periodic factor when the N periodic components exist or the target time series does not have the periodic factor when the N periodic components do not exist.

13. The method of claim 12, wherein the target time series is periodic when the periodic factor exists or the target time series is aperiodic when the periodic factor does not exist.

14. The method of claim 10, wherein
the jitter density is according to the following formula:

$$R = \frac{\Sigma_0^{N-1} r_n}{N},$$

wherein R is the jitter density,
wherein $r_n$ is according to the following formula:

$$r_n = \begin{cases} 1, & \sqrt{\frac{\Sigma_n^{nW-1} C_n^2}{\Sigma_n^{nW-1} x_n^2}} \geq \alpha \\ 0, & \sqrt{\frac{\Sigma_n^{nW-1} C_n^2}{\Sigma_n^{nW-1} x_n^2}} < \alpha \end{cases},$$

wherein $C_n$ is an $n^{th}$ element in the second sub-time series,
wherein $x_n$ is an $n^{th}$ element in the target time series,
wherein N is according to the following formula:

$$N = \left[\frac{T}{W}\right],$$

wherein T is a length of the target time series, wherein W is a window length of an addition window, and wherein a is a first preset value.

15. The method of claim 10, wherein the target time series is spiky when the jitter density is greater than a second preset value or the target time series is stationary when the jitter density is less than or equal to the second preset value.

16. An apparatus comprising:
a processor; and
a memory coupled to the processor and configured to store instructions that when executed by the processor, cause the apparatus to be configured to:
obtain a target time series comprising N elements, wherein the N elements correspond to N moments, and wherein each of the N elements is traffic data received at a corresponding moment;
obtain a target parameter of the target time series based on the target time series, wherein the target parameter comprises at least one of a periodic factor or a jitter density, wherein the periodic factor represents a wave-shaped change that is presented in the target time series and that is about a trend that represents an overall change of the target time series, and wherein the jitter density is used to represent a deviation between an actual value of the target time series and a target value of the target time series within a target time;

obtain, based on a first mapping relationship and a first type of the target time series, a first-type decision model, and wherein the first mapping relationship comprises correspondences between a plurality of types and a plurality of first-type decision models, wherein the first type of the target time series is based on the plurality of types and on the target parameter, wherein each of the types corresponds to one parameter set and corresponds to a type of decision model, and wherein the target parameter belongs to a parameter set that corresponds to the first type; and detect an anomaly of the target time series based on the first-type decision model that corresponds to the first type.

17. The apparatus of claim 16, wherein the instructions that when executed by the processor further cause the apparatus to be configured to:
decompose each of the N elements into a trend component, a periodic component, and a residual component;
obtain a first sub-time series comprising N periodic components and a second sub-time series comprising N residual components; and
further obtain the target parameter based on the first sub-time series or the second sub-time series.

18. The apparatus of claim 17, wherein the instructions that when executed by the processor further cause the apparatus to be configured to determine, based on the first sub-time series, whether the target time series has the periodic factor.

19. The apparatus of claim 18, wherein the target time series has the periodic factor when the N periodic components exist or the target time series does not have the periodic factor when the N periodic components do not exist.

20. The apparatus of claim 17, wherein the jitter density is based on the second sub-time series.

* * * * *